United States Patent [19]

Deconche et al.

[11] Patent Number: 4,527,278
[45] Date of Patent: Jul. 2, 1985

[54] METHOD FOR CORRECTING THE FREQUENCY OF A LOCAL CARRIER IN A RECEIVER OF A DATA TRANSMISSION SYSTEM AND RECEIVER USING THIS METHOD

[75] Inventors: Alain Deconche, Guyancourt; Jean-Pierre H. Van Uffelen, Rungis, both of France

[73] Assignee: U.S. Philips Corporation, New York, N.Y.

[21] Appl. No.: 483,085

[22] Filed: Apr. 7, 1983

[30] Foreign Application Priority Data

Apr. 9, 1982 [FR] France ............................ 82 06289

[51] Int. Cl.³ ........................................... H04L 27/16
[52] U.S. Cl. ..................................... 375/97; 329/122; 328/155
[58] Field of Search .................. 375/93, 94, 97, 111, 375/118; 329/50, 122; 328/155; 455/257, 258, 260, 265

[56] References Cited

U.S. PATENT DOCUMENTS

| | | | |
|---|---|---|---|
| 3,447,085 | 5/1969 | De Haas et al. ................. | 375/97 |
| 3,961,262 | 6/1976 | Gassmann ....................... | 455/258 |
| 4,213,006 | 7/1980 | Gerges ............................ | 375/97 |
| 4,313,219 | 1/1982 | Gabler et al. .................... | 375/97 |
| 4,328,587 | 5/1982 | Mizuno et al. .................. | 375/97 |

Primary Examiner—Robert L. Griffin
Assistant Examiner—Stephen Chin
Attorney, Agent, or Firm—Thomas A. Briody; William J. Streeter

[57] ABSTRACT

A frequency correction method used in the receiver of a data transmission system in which a synchronizing word is transmitted before the data. During each of several steps there are calculated at least one pair of in-phase partial correlations $C_r(k-1)$, $C_r(k)$ and at least one pair of quadrature partial correlations $C_i(k-1)$, $C_i(k)$. The partial correlations of the order $(k-1)$ and $(k)$ in each step relate to two consecutive portions of the same length of a local synchronizing word and the samples of the received demodulated signal; the portions of a step p are greater than the portions of step $p-1$; the partial correction of a step p are phase-corrected by taking account of the frequency correlation calculated in step $p-1$. A frequency deviation is calculated from the partial correlations of each step. The final frequency correction to be retained is the sum of the frequency deviations calculated at the end of each step.

11 Claims, 11 Drawing Figures

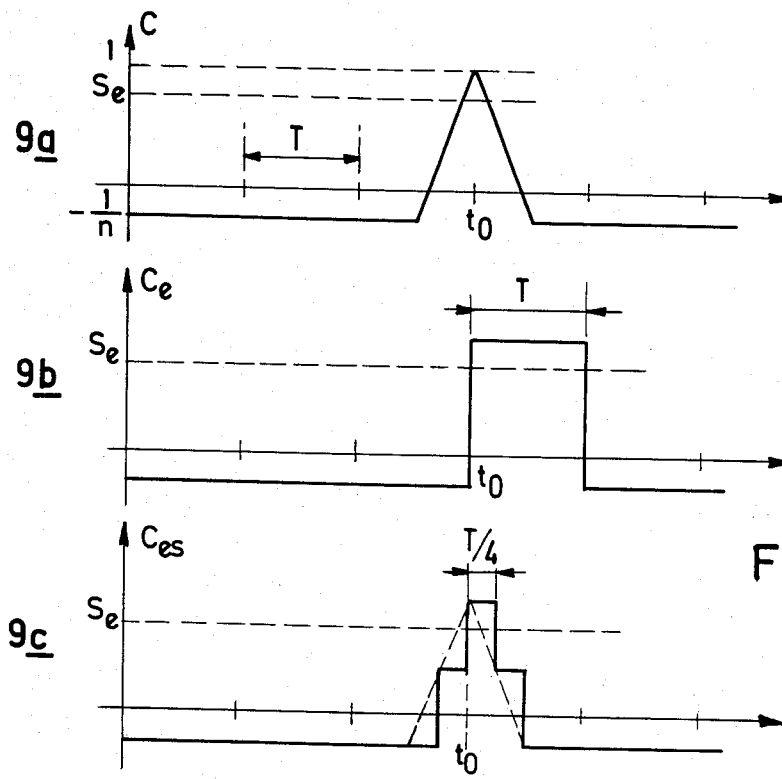
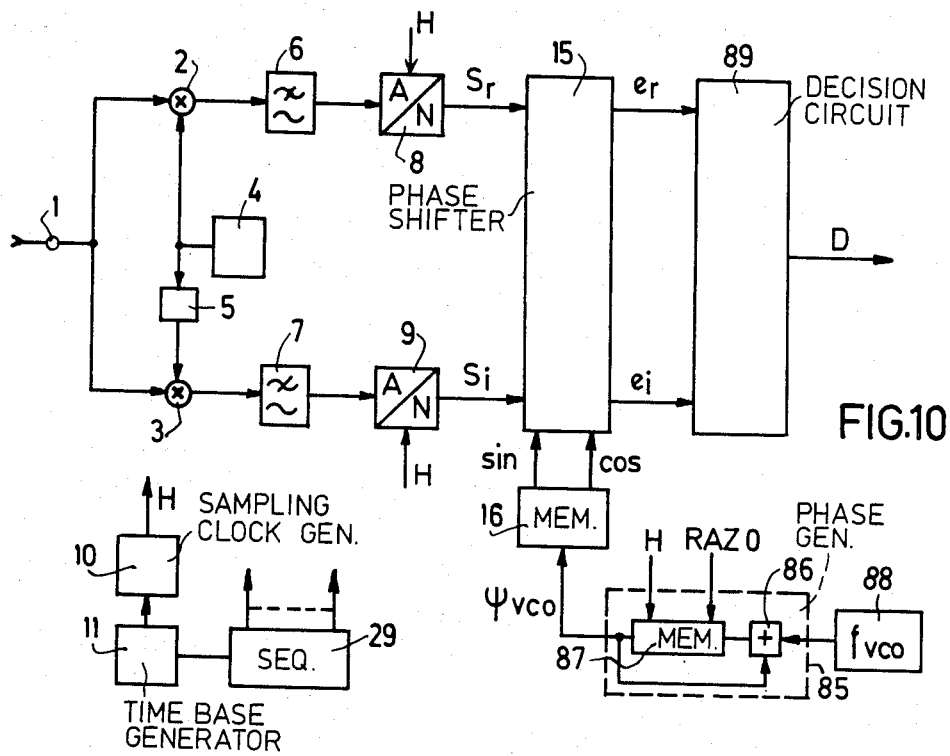

METHOD FOR CORRECTING THE FREQUENCY OF A LOCAL CARRIER IN A RECEIVER OF A DATA TRANSMISSION SYSTEM AND RECEIVER USING THIS METHOD

BACKGROUND OF THE INVENTION

1. Field of the Invention

The invention relates to a frequency correction method intended to correct the frequency of a local carrier in a receiver of a data transmission system in which the data are transmitted by carrier modulation and a receiver synchronizing word is transmitted before the data, this receiver comprising means for demodulating a received signal with the aid of signals in phase and in quadrature with a local carrier, means for sampling the inphase and quadrature demodulated signals with a sampling frequency equal to the modulation rate, each new pair of in-phase and quadrature samples thus formed being written into a received-signal memory, the receiver further comprising a synchronizing-word memory containing the in-phase and quadrature samples of a local synchronizing word which is identical to the transmitted synchronizing word.

The invention also relates to a receiver used in a data transmission system, this receiver utilizing this method.

2. Description of the Prior Art

It is known that in data transmission systems using carrier modulation the correct recovery of the data assumes the acquisition of several synchronizations in the receiver, more specifically the synchronization of the local carrier so as to permit coherent demodulation of the received signal, the synchronization of a local clock (alternatively denoted bit synchronization) so as to permit optimum sampling of the demodulated signal, and finally the frame synchronization (alternatively denoted word synchronization) so as to permit marking the beginning of a communication. To acquire these various synchronizations before the start of a communication, the conventional method is to have each communication be preceded by a preamble which comprises, for example, a pure carrier for the synchronization of the local carrier, an alternating sequence of "1" and "0" bits for the synchronization of the local clock and finally a known word for word synchronization. This acquisition system, which comprises phase or frequency control loops for carrier synchronization and clock synchronization, is very slow and is not so suitable for contemporary digital communication systems for data packets in which the duration of the communications can be very short, for example of the order of one second.

For these systems, which require a fast synchronization of the receiver, the initial synchronization of the receiver is preferably effected without the use of control loops, by only using a synchronizing word which is transmitted and is known in the receiver. In an article by M. H. Meyers and L. E. Franks, entitled "Joint Carrier Phase and Symbol Timing Recovery for PAM Systems", published in IEEE Transactions, Vol. COM-28, No. 8, August 1980, pages 1121-1129, a method of this type is described which is based on the calculation of the correlation function between a local synchronizing word, which is identical to the transmitted synchronizing word. The received demodulated signal is observed during a time window which is equal to the duration of the synchronizing word. In accordance with this method, local carrier synchronization and local clock synchronization are obtained simultaneously by calculating the phase values of the local carrier and the local clock which maximize the said correlation function. These optimum phase values are obtained by extrapolation on the basis of estimated values which are reasonably close to the optimum values. With this known method the determination of the local carrier phase is closely connected to the determination of the local clock phase so that it would be rather difficult to employ this method.

The present invention also permits rapid acquisition of the synchronization of the receiver by using only one synchronizing word transmitted as a preamble before a communication, but by using a totally different method as regards the synchronization of the local carrier. The invention provides a method for correcting the frequency of the local carrier, based on measuring the frequency deviations between the local carrier and the received carrier and making it possible to acquire the carrier, clock and frame synchronizations in one sampling period.

SUMMARY OF THE INVENTION

According to the invention, the method is characterized in that, during each sampling period, synchronized reading of n pairs of samples contained in the synchronizing-word memory and n pairs of samples written last into the received-signal memory is effected at least once, in order to determine in P steps ($P \geq 1$) the magnitude of the frequency correction to be effected on the local carrier:

during each step, there are calculated from the said read samples at least one pair of in-phase partial correlations $C_r(k-1)$, $C_r(k)$ and at least one pair of quadrature partial correlations $C_i(k-1)$, $C_i(k)$, the partial correlations of the order $(k-1)$ and $(k)$ in each step employing two consecutive portions of the same length of the local synchronizing word, the partial correlations of the step of the order $p > 1$ using portions of the synchronizing word of a length which exceeds the length of the portions used during the preceding step of the order $p-1$, the partial correlations of the step of the order $p$ being calculated while taking account of the frequency correction calculated at the end of the preceding step of the order $p-1$;

during each step, there is calculated at least one quantity $E = C_r(k-1) \cdot C_i(k) - C_i(k-1) \cdot C_r(k)$ which is corrected as a function of the level of the received signal so as to provide a corrected quantity of $E^*$ which is a predetermined function $$E^* = \sin \Delta\varphi \cdot \left[ \frac{\sin \frac{\Delta\varphi}{2}}{b \sin \frac{\Delta\varphi}{2b}} \right]^2$$

of the phase deviation $\Delta\varphi$ produced by the frequency deviation $\Delta f$ between the local carrier and the received carrier during a time interval corresponding to the number of bits $b$ which form the length of the said portions of the synchronizing word;

at the end of each step $p \geq 1$, there is calculated from at least one corrected quantity $E^*$, which is formed during the step and which is of the same length as the portions of the synchronizing word used during the step, the frequency deviation $\Delta f_p$, and thereafter the sum $$\sum_{i=1}^{p} \Delta f_i$$

is formed. This sum constitutes an estimate of the magnitude of the frequency correction, this estimate at the end of the step P being the final value to be retained for the magnitude of the frequency correction to be effected on the local carrier.

Calculating a frequency deviation $\Delta f_p$ during a step of the method in accordance with the invention can be simplified if each quantity E calculated during this step is corrected by dividing this quantity E by a term equal to the sum of the squares of the in-phase partial correlations and the quadrature partial correlations used during the calculation of E, so that the corrected quantity E becomes the function $E^* = \sin \Delta \varphi$ of the phase deviation $\Delta \varphi$.

In a receiver in which the method in accordance with the invention is used, it is advantageous to effect the search for frame synchronization after the last frequency correction calculation step. In that case the means provided in the receiver to form the partial correlation until the last step P are inter alia controlled, taking account of the final frequency correction calculated at the end of the step P, in order to form the complete in-phase and quadrature correlations relating to the total length of the synchronizing word, additional means being provided to form the sum of the squares of the said complete in-phase and quadrature correlations and to compare this sum with a threshold, exceeding of this threshold indicating at the same time the acquisition of the frame synchronization and the frequency correction to be effected on the local carrier for the transmission of data following this acquisition of frame synchronization.

In a receiver of this type, in which the received demodulated signal is sampled with a sampling frequency j/T which is a multiple of the modulation rate 1/T, so as to form j sampled signals having the period T and being interleaved, it is advantageous to effect at the same time the search for frame synchronization and the search for the optimum position of the sampling instants (that is to say the search for local clock synchronization), after the last frequency correction calculating step. In this case, the means provided in the receiver for forming the magnitude of the frequency corrections and thereafter the sum of the squares of the complete in-phase and quadrature correlations are used in time sharing for each one of the said j interleaved signals, the j sums of the squares of the correlations thus formed during one modulation period being compared with a threshold, exceeding of this threshold indicating at the same time the acquisition of the frame synchronization, the frequency correction to be effected on the local carrier and the optimum position of the sampling instants to be used for the transmission of data following the acquisition of the frame synchronization.

The following description which is given by way of example with reference to the accompanying drawings will make it better understood how the invention can be realized.

BRIEF DESCRIPTION OF THE DRAWINGS

FIG. 9 shows time diagrams which represent the complete correlation between the local synchronizing word and the received demodulated signal, these diagrams illustrating how it is possible to obtain frame and clock synchronization in a receiver after the last step of the method according to the invention.

FIG. 10 shows the configuration of a receiver after synchronization has been acquired by means of the method according to the invention.

DETAILED DESCRIPTION OF THE PREFERRED EMBODIMENTS

Figure 1:
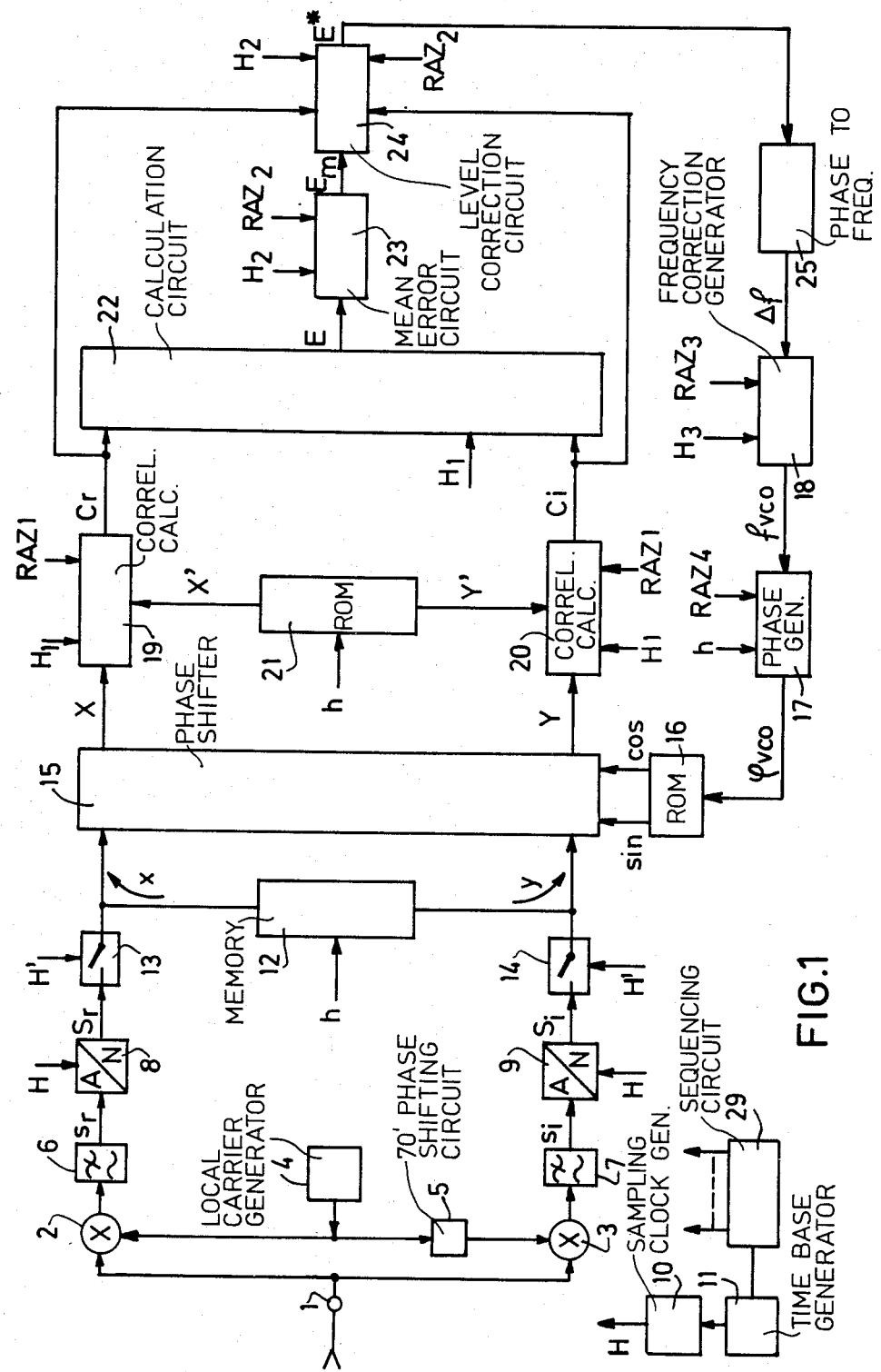
FIG. 1 is a schematic diagram which shows how the method according to the invention can be employed in the receiver of a data transmission system.

FIG. 1 shows the schematic diagram of a receiver of a data transmission system in which the frequency correction method according to the invention is employed. In the remote transmitter (not shown) a carrier in phase-modulated and/or amplitude-modulated or frequency-modulated by the data signal to be transmitted, to form the modulated carrier signal which is transmitted to the receiver via a transmission path of limited bandwidth. The transmission is, for example, effected via a radio channel.

The modulated signal received at an input 1 of the receiver shown in FIG. 1 is applied to two mixers 2 and 3 for demodulation by two local carrier signals whose phases are shifted 90° relative to each other. The in-phase local carrier signal supplied directly by a local carrier generator 4 is applied to mixer 2 and the quadrature local carrier signal derived from generator 4 via a 90° phase shifting circuit 5 is applied to mixer 3. Two low-pass filters 6 and 7 connected to the output of mixers 2 and 3 remove the frequency components located above the band used for the transmission and supply the in-phase and quadrature demodulated signals $s_r$ and $s_i$, respectively. These signals $s_r$ and $s_i$ are the real and the imaginary components, respectively, of a base-band signal which is representative of the data signal used to modulate the carrier in the remote transmitter. Thereafter the signals $s_r$ and $s_i$ are sampled in circuits 8 and 9 at a sampling frequency H which is here assumed to be equal to the modulation rate 1/T in the transmitter, T being the modulation interval. The sampling frequency H is supplied by a generator 10 producing a low-frequency local clock derived from a time base generator 11, which has a much higher frequency. If the subsequent processing operations in the receiver are effected in a digital manner, which in practice is the case in a receiver using the method according to the invention, the samples produced in circuits 8 and 9 are there furthermore converted into the digital form. It being assumed that synchronization of the receiver has been acquired, the in-phase samples $S_r$ and the quadrature samples $S_i$ may be applied directly (or via an equalizer) to the decision circuit of the receiver, this decision circuit (not shown) having for its object to recover the data.

But a correct recovery of the data implies in the first place a rigorous frequency and phase synchronization of the local carrier, used for the demodulation in the receiver, with the carrier of the received signal. A typical value of the highest permissible difference between the frequencies of these two carriers is 1 Hz, which, related for example to a RF carrier frequency of 30 MHz, corresponds to a precision of $3 \cdot 10^{-8}$. As for various reasons, for example the Doppler effect in the case of communications between vehicles, the frequency of the received carrier may deviate much more than 1 Hz, it is necessary to correct the frequency of the local demodulating carrier before each communication so as to ensure that the difference between the frequencies of this local carrier and the received carrier does not exceed the permissible limit.

For the correct recovery of the data it is also necessary to synchronize the frequency and the phase of local sampling clock generator 10 with the clock information contained in the received signal so as to ensure that sampling of the signals $s_r$ and $s_i$ in circuits 8 and 9 is effected with the modulation rate 1/T and with the optimum phase.

Finally, it is necessary for the correct recovery of the data to effect the frame synchronization which permits marking the beginning of each communication. This frame synchronization is obtained in a conventional way by recognizing in the receiver a frame synchronizing word transmitted before each data message. This recognition may be effected by calculating the correlation function between a frame synchronizing word generated locally in the receiver and the samples of the received demodulated signal which are formed with the aid of the in-phase and quadrature Samples $S_r$ and $S_i$. For a rapid acquisition of the local carrier and local clock synchronization, the above-mentioned article by Meyers and Franks proposes to act simultaneously on the phases of the demodulating carrier and the sampling clock so as to maximize the correlation function calculated for acquiring frame synchronization.

The present invention, while using the frame synchronization sequence, operates in a different manner and provides a frequency corection method for the local carrier which is performed completely during one sampling period and, at the end of this period, permits acquiring the carrier synchronization, the frame synchronization and the sampling clock synchronization.

For the sake of simplicity of the description of the method according to the invention, the principles on which it is based will first be explained. Although this method may be applied to a system using any type of modulation whatsoever, it will be assumed for simplifying the explanations that it is applied to a transmission system using two-state (binary) phase modulations.

In these circumstances the modulated signal, transmitted by the remote transmitter may be written:

$$a(t) = A \sin(\omega t + \theta_K \cdot \pi/2)$$

where

A is the amplitude of the carrier $\omega$ is the angular frequency of the carrier $\theta_K = \pm 1$ is a data bit transmitted during an interval of time t with $KT < t \leq (K+1)T$, T being the modulation period and K being an integer characterizing the time interval.

The coherent demodulation of the received signal may be effected in the receiver by beating the received signal with a local carrier of the same frequency and the same phase as the carrier of the received signal. This beating operation is effected in mixer 2 and, assuming the received signal to have exactly the shape of the transmitted signal a(t), it corresponds to the expression:

$$a(t) \cdot \sin(\omega t + \pi/2) = A \cdot \sin(\omega t + \theta_K \cdot \pi/2) \cdot \sin(\omega t + \pi/2)$$

After removal of the component having twice the frequency of the beat signal by means of filter 6 the demodulated signal $$s_r = (A/2) \sin \theta_K \cdot \pi/2$$

is obtained which, for the two possible values $\pm 1$ of $\theta_K$, has the form:

$$s_r = (A/2) \theta_K$$

If the frequency of the local carrier used for the demodulation differs from the frequency of the carrier of the received signal by an amount $\Delta f$, the demodulated signal is written:

$$(A/2) \theta_K \cdot \cos(\Delta \omega \cdot t) \quad (1)$$

$\Delta \omega = 2 \pi \Delta f$ being the difference in angular frequency between the two carriers.

So the demodulated signal is effected by an amplitude modulation at the rate of the frequency deviation $\Delta f$. This amplitude modulation may seriously disturb the correct recovery of the data in the decision circuit of the receiver.

In the receiver, the detection of the frame synchronizing word transmitted before each data message is also effected by a frequency difference between the local carrier and the carrier of the received signal. If the synchronizing word comprises n bits, this detection is effected in a customary manner by calculating the correlation function G between a local copy of the synchronizing word and the demodulated signal.

The sequence of n bits of the local synchronizing word is denoted by $\theta_l$ (l being an integer which varies from 0 to $n-1$), a sequence of n data bits contained in the received signal is designated $\theta_K(l)$; the duration of a bit being the modulation period T, the correlation function G is written, using formula (1):

$$G = \frac{1}{n}\sum_{l=0}^{n-1}\frac{A}{2}\cdot\theta_K(l)\cdot\cos(l\cdot\Delta\omega\cdot T)\cdot\theta(l)$$

When the sequence $\theta_K(l)$ of the received signal and the sequence $\theta(l)$ of the local synchronizing word are identical, the correlation function G becomes, when it is assumed for the sake of simplicity that the amplitude factor A/2 is equal to 1:

$$G_m = \frac{1}{n}\sum_{l=0}^{n-1}\cos(l\cdot\Delta\omega\cdot T)$$

It can be shown that $G_m$ may be written as:

$$G_m = \cos\left[\frac{(n-1)\cdot\Delta\omega\cdot T}{2}\right]\cdot\frac{\sin\left(\frac{n\Delta\omega T}{2}\right)}{n\cdot\sin\left(\frac{\Delta\omega T}{2}\right)} \quad (2)$$

In this way the value $G_m$ taken by the correlation function G for two identical sequences $\theta_l$ and $\theta_K(l)$ is not at its maximum and equal to 1, but depends on the frequency deviation between the received and local carriers, which may seriously disturb the detection of the synchronizing word. Thus, it can be easily deduced from formula (2) that the value $G_m$ of the correlation function becomes zero for frequency deviations $\Delta f$ such that:

$$n\Delta\omega T/2 = k_1\pi$$

or $$\Delta f = k_1/(nT)$$

($k_1$ integer $\neq 0$).

It is therefore necessary for a correct detection of the synchronizing word that the frequency deviation $\Delta f$ is less than $1/nT$.

The method according to the invention has for its object to correct this frequency deviation $\Delta f$ to enable first the correct detection of the frame synchronizing word, and then the correct demodulation of the transmitted data after frame synchronization has been acquired. This method is based on an evaluation of the average phase deviation due to this frequency deviation and existing between two equal and consecutive portions of the synchronizing word. First the case will be considered in which these two portions are two halves of the synchronizing word. For the case of a synchronizing word having n bits, the phase deviation between the two blocks forming the two halves of this word is:

$$\Delta\varphi = N\cdot\Delta\omega\cdot T$$

$N = n/2$ being the number of bits of each block.

For an evaluation of this phase deviation $\Delta\varphi$, the in-phase and quadrature samples of the demodulated received signal and the in-phase and quadrature samples of the local synchronizing word are used and 4 correlation functions are calculated which will be denoted partial correlations hereinafter as they each relate to a portion of the synchronizing word.

the partial correlation $C_r^1$ between the first half of the in-phase samples of the synchronizing word and a first sequence of N samples of the in-phase demodulated signal;

the partial correlation $C_r^2$ between the second half of the in-phase samples of the synchronizing word and a second sequence of N samples of the in-phase demodulated signal, this second sequence being consecutive to the first;

the partial correlation $C_i^1$ which is similar to the partial correlation $C_r^1$, but uses quadrature samples;

the partial correlation $C_i^2$ which is similar to the partial correlation $C_r^2$, but uses quadrature samples.

By putting $\Delta\varphi' = (N-1)\cdot\Delta\omega\cdot T$, it can be shown that, when the samples of the synchronizing word and the samples of the demodulated signal are identical, the correlation functions $C_r^1$, $C_r^2$, $C_i^1$, $C_i^2$ take the values:

$$(3)\begin{cases} C_r^1 = \frac{1}{N}\sum_{l=0}^{N-1}\cos(l\Delta\omega T) = \cos\left(\frac{\Delta\varphi'}{2}\right)\frac{\sin\frac{\Delta\varphi}{2}}{N\sin\left(\frac{\Delta\varphi}{2N}\right)} \\[1em] C_r^2 = \frac{1}{N}\sum_{l=N}^{2N-1}\cos(l\Delta\omega T) = \cos\left(\Delta\varphi+\frac{\Delta\varphi'}{2}\right)\cdot\frac{\sin\frac{\Delta\varphi}{2}}{N\sin\left(\frac{\Delta\varphi}{2N}\right)} \\[1em] C_i^1 = \frac{1}{N}\sum_{l=0}^{N-1}\sin(l\Delta\omega T) = \sin\left(\frac{\Delta\varphi'}{2}\right)\frac{\sin\frac{\Delta\varphi}{2}}{N\sin\left(\frac{\Delta\varphi}{2N}\right)} \\[1em] C_i^2 = \frac{1}{N}\sum_{l=N}^{2N-1}\sin(l\Delta\omega T) = \sin\left(\Delta\varphi+\frac{\Delta\varphi'}{2}\right)\cdot\frac{\sin\frac{\Delta\varphi}{2}}{N\sin\left(\frac{\Delta\varphi}{2N}\right)} \end{cases}$$

For the values $C_r^1$, $C_r^2$, $C_i^1$, $C_i^2$ calculated from the formulae (3), the quantity $E = C_r^1\cdot C_i^2 - C_r^2\cdot C_i^1$ takes the value:

$$C_r^1\cdot C_i^2 - C_r^2\cdot C_i^1\left[\frac{\sin\left(\frac{\Delta\varphi}{2}\right)}{N\sin\left(\frac{\Delta\varphi}{2N}\right)}\right]^2$$

This quantity E is often designated as an "error" as it represents the phase deviation $\Delta\varphi$ and finally the frequency deviation between the received carrier and the local carrier.

As the partial correlations depend on the level of the received signal, the error E thus calculated also depends on the level of the received signal. In order to get rid of possible variations in the level of the received signal, the error E may be corrected by dividing it by a correction term equal to the sum of the squares of the in-phase and quadrature samples of the demodulated received signal. In this way a corrected error E* is obtained which only depends on the phase deviation $\Delta\varphi$ and is such that:

$$E^* = \sin(\Delta\varphi) \cdot \left[ \frac{\sin\left(\frac{\Delta\varphi}{2}\right)}{N \sin \frac{\Delta\varphi}{2N}} \right]^2 \quad (4)$$

For a phase deviation which is very small relative to $\pi/2$, the factor $$\left[ \frac{\sin \frac{\Delta\varphi}{2}}{N \sin \frac{\Delta\varphi}{2N}} \right]^2$$

remains very close to 1 and the corrected error $E^*$ becomes substantially equal to $\sin \Delta\varphi$.

But it is preferred to effect the correction of the error E by using the partial correlations $(C_r^1, C_i^1)$ or $(C_r^2, C_i^2)$ by dividing this error E by the quantities $(C_r^1)^2+(C_i^1)^2$ or $(C_r^2)^2+(C_i^2)^2$. It can be easily seen that these quantities are such that:

$$(C_r^1)^2 + (C_i^1)^2 = (C_r^2)^2 + (C_i^2)^2 = \left[ \frac{\sin \frac{\Delta\varphi}{2}}{N \sin \frac{\Delta\varphi}{2N}} \right]^2 \cdot k^2$$

k representing the amplitude of the received signal. Consequently, by effecting the correction of the error E in this way, it is strictly obtained that:

$$E^* = \sin \Delta\varphi.$$

The phase deviation $\Delta\varphi$ being determined in one way or another from the corrected error $E^*$, it is possible to determine the frequency deviation $\Delta f$ which has caused this phase deviation, as $\Delta\varphi = N\Delta\omega T = N2\pi\Delta f T$. This measured frequency deviation $\Delta f$ can then be utilized to correct the frequency of the local carrier used for the demodulation.

A frequency correction method based on the correlations on two halves of the synchronizing word offers a certain limitation as regards the domain of the measurable frequency deviation $\Delta f$. Actually, for an unambiguous determination of the phase deviation $\Delta\varphi$ between these two halves of the synchronizing word, based on the corrected error $E^*$ which may now be assumed to be equal to $\sin \Delta\varphi$, it is necessary that $|\Delta\varphi| < \pi/2$. For a given sampling rate $1/T$ the result is that the considered arrangement can only measure and consequently correct frequency deviations which are less than a maximum value $\Delta f_{max}$ such that:

$$N \cdot 2\pi \Delta f_{max} T = \pi/2$$

or $$\Delta f_{max} = 1/(4NT).$$

It should be noted here that it is possible to extend the limit of the measurable frequency deviation $\Delta f$, such that $|\Delta\varphi| < \pi$, if, in addition to $E = C_r^1 C_i^2 - C_r^2 C_i^1$, the quantity $F = C_r^1 C_r^2 + C_i^1 C_i^2$ were calculated which, after having been corrected in the same way as E, results in the corrected quantity $F^* = \cos \Delta\varphi$.

The maximum measurable frequency deviation $\Delta f_{max}$ may be insufficient to correct the actual frequency deviation. In order to increase it, it will be obvious that one can reduce the length of the synchronizing word portion to which the partial correlations relate. For example, to double the maximum measurable frequency deviation, the synchronizing word having a length $n=2N$ is divided into 4 equal portions of the length $N'=N/2$. In this case the frequency correction method effecting the partial correlations on the portions of the length N' is capable of measuring a frequency deviation up to $\Delta f'_{max}$ such that:

$$\Delta f'_{max} = 1/4N'T = 2/4NT = 2\Delta f_{max}$$

By dividing the synchronizing word in still shorter portions, the range of measurable frequency deviations is still further increased. But it will be obvious that this increase of the range is to the detriment of the measuring precision of the frequency deviation, this precision varying in proportion with the length of the portions used for the measurement.

To obviate this disadvantage, the invention proposes to operate in several steps during each of which a frequency deviation is measured by using portions of the synchronizing word of a predetermined length and at the end of which a frequency correction corresponding to the measured deviation is effected. In the succession of steps, the measurements are effected with portions of increasing lengths so that the range of measurable frequency deviations decreases. But since the frequency corrections are effected at the end of each step before the following measurement is performed, the frequency deviations to be measured in the sequence of steps also decrease, while the measuring precision increases.

All the above formulae for the determination of the frequency deviation $\Delta f$ on the basis of partial correlations relating to two halves of the synchronizing word can easily be extended to any step in which partial correlations are used relating to the consecutive portions of any length of the synchronizing word.

Thus, if $(k-1)$ and k are the order of two consecutive portions of the same length of the synchronizing word, the in-phase partial correlations $C_r(k-1)$, $C_r(k)$ and the quadrature partial correlations $C_i(k-1)$, $C_i(k)$ are determined.

From these partial correlations an error E can be calculated in accordance with the expression:

$$E = C_r(k-1)C_i(k) - C_i(k-1)C_r(k) \quad (5)$$

The error E corrected as regards its dependence on the level of the received signal, that is the corrected error $E^*$, has the value:

$$E^* = \sin(\Delta\varphi) \left[ \frac{\sin \frac{\Delta\varphi}{2}}{b \sin \frac{\Delta\varphi}{2b}} \right]^2 \quad (6)$$

where $\Delta\varphi$ is the phase deviation between the two portions of the synchronizing word and b is the number of bits of each of these portions.

For small values of the phase deviation $\Delta\varphi$ or when effecting a correction using the sum of the squares of the partial correlations, as explained above, the corrected error $E^*$ has substantially the value:

$$E^* = \sin(\Delta\varphi) \qquad (7)$$

When the number of portions of the synchronizing word used during a step is higher than 2, it is advantageous, to improve the measuring precision of the frequency deviation, to calculate several errors E, to take the mean value $E_m$ and to calculate the corrected $E^*$ from this mean value $E_m$.

On the basis of formula (6) or in practice on the basis of formula (7), the phase deviation $\Delta f$ can be obtained. The frequency deviation $\Delta f$ which gave rise to this phase deviation $\Delta \varphi$ for two b-bit portions can be obtained with the aid of the relation:

$$\Delta\varphi = b \cdot \Delta\omega \cdot T = b \cdot 2\pi \Delta f T \qquad (8)$$

So, in a procedure using P steps, a frequency deviation $\Delta f_p$ is determined at the end of each step p and therefore the sum $$\sum_{i=1}^{p} \Delta f_i$$

which for this step constitutes a certain estimate of the magnitude of the frequency correction to be effected on the local carrier. This sum formed at the end of the last step P is the value to be retained for this frequency correction during the data transmission after frame synchronization has been acquired.

In order to determine the length and the breaking-up of the synchronizing word, which operations are necessary for a frequency correction method effected in several steps, two constraints have to be taken into account:

the maximum frequency deivation to be measured, the precision required for the frequency deviation measurement.

The maximum frequency deviation determines the maximum length of the smallest portions of the synchronizing word used in the first step where the frequency deviation measurement is the least precise. The final precision required determines the minimum length of the two portions used in the last step. A method utilizing P steps may be implemented by dividing the n bit synchronizing word into elementary portions having the following respective number of bits: $n/2^P$, $n/2^{P-1}$, ... $n/2^2$, $n/2$. The two constrains mentioned above will be respected when the smallest portions of $n/2^P$ bits allow an effective measurement of the initial frequency deviation imposed and when the two largest portions of $n/2$ bits provide the measurement with the required precision.

Figure 2:
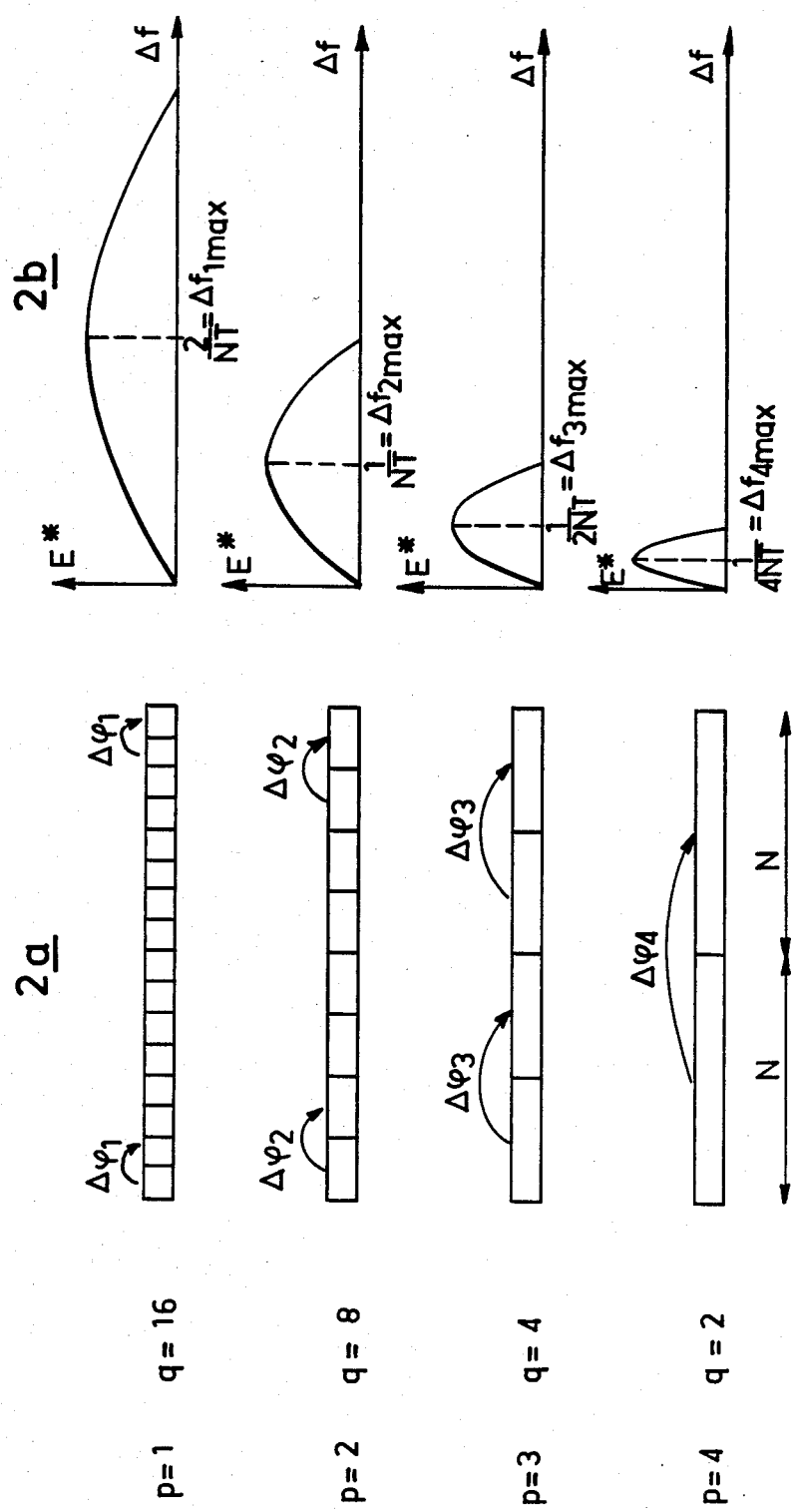
FIG. 2 illustrates the different steps of the method according to the invention; the waveforms in 2a show the portions of the synchronizing word used and the waveforms in 2b represent the corrected quantity E* as a function of the frequency deviation $\Delta f$.

FIG. 2 shows diagrams to illustrate the method according to the invention when this method is effected in, for example, p=4 steps. Part 2a of the FIG. 2 shows for each step of the order p=1, 2, 3 and 4 the n=2N bit synchronizing word divided into q portions of the same lengths in each step. Part 2b shows for each step 1, 2, 3 or 4 the curve of the corrected error $E^* = \sin \Delta\varphi$, as a function of the frequency deviation $\Delta f$.

In step 1, the synchronizing word is divided into $q = 2^4 = 16$ portions, each having a length of n/16 bits. It is thus possible to calculate 16 in-phase and quadrature partial correlations, to produce 15 errors E of which the mean value is taken and finally to determine a corrected error $E^*$ which is in practice such that $E^* = \sin(\Delta\varphi_1)$, $\Delta\varphi_1$ being the average phase deviation between two portions. The phase deviation $\Delta\varphi_1$ can be derived therefrom and thereafter the frequency deviation $\Delta f_1$ using the relation $$\Delta\varphi_1 = \pi N \Delta f_1 T/4$$

In part 2b of the figure, the curve of the corrected error $E^*$ as a function of $\Delta f_1$ has the shape of a sinusoidal arc. Its useful portion, shown by thick lines, is limited to the maximum value $\Delta f_{1\ max}$ of the frequency deviation $\Delta f_1$, for which the phase deviation is $\Delta\varphi_1 = \pi/2$. It can be easily seen that $\Delta f_{1\ max} = 2/(NT)$. At the end of this step 1, the frequency of the local carrier is corrected for the measured frequency deviation $\Delta f_1$, which works out in a correction of the phase of the demodulated signal to be correlated with the portions of the synchronizing word used in the subsequent step 2.

In step 2, the synchronizing word is divided into $q = 2^3 = 8$ portions, each having a length of n/8 bits. There still is a phase deviation $\Delta\varphi_2$ between two consecutive portions due to the imperfect estimation of the frequency deviation in step 1. But measures are taken to ensure that this phase deviation $\Delta\varphi_2$ is less than $\pi/2$, so that the remaining frequency deviation $\Delta f_2$ is less than the maximum frequency deviation $\Delta f_2$ max which is half the maximum deviation $\Delta f_{1\ max}$, so $\Delta f_{2\ max} = 1/(NT)$ (see part 2b of the Figure). In this step 2 an estimation of the frequency deviation $\Delta f_2$ can be made by calculating 7 errors E of which the average value is taken. At the end of step 2, the measured frequency deviation $\Delta f_2$ is taken into account for the correction of the phase of the demodulated signal to be correlated with the portions of the synchronizing word in the subsequent step 3.

In step 3, the synchronizing word is divided into $q = 2^2 = 4$ portions each having a length of n/4 bits and between which there is a phase deviation $\Delta\varphi_3$. The maximum measurable frequency deviation is $\Delta f_{3\ max} = 1/(2NT)$. Estimating the frequency deviation $\Delta f_3$ may be done by calculating 3 errors E of which the average value is taken. At the end of this step, the measured frequency deviation $\Delta f_3$ is taken into account for the correction of the phase of the demodulated signal to be correlated with the portions of the synchronizing word in the subsequent step 4.

In the step 4 the synchronizing word is divided into $q = 2$ halves, each having a length of $N = n/2$ bits and between which there is the phase deviation $\Delta\varphi_4$. The maximum measurable frequency deviation is $\Delta f_{4\ max} = 1/(4NT)$. The frequency deviation $\Delta f_4$ is measured by calculating the error E from the two halves of the synchronizing word. At the end of this step 4 the frequency deviation measured may be taken account of for the correction of the phase of the demodulated signal which, in a following step not being part of the frequency correction procedure proper, may be correlated with the total synchronizing word with the object of acquiring frame synchronization and, possibly, sampling clock synchronization, as will be explained hereinafter.

At the end of the last step 4 of the frequency correction procedure proper, the frequency correction of the local carrier to be retained is the sum of the 4 frequency deviations measured, namely $\Delta f_1 + \Delta f_2 + \Delta f_3 + f_4$. This frequency correction is effectively used for the demodulation of the received signal, when frame synchronization is obtained.

Now the structure of an arrangement using the method according to the invention will be described with reference to FIG. 1, and its mode of operation in the case of a 4-step procedure will be described with reference to FIG. 3.

As shown in FIG. 1, the frequency correction arrangement comprises a memory 12 which can be connected to the output of circuits 8 and 9 via gate circuits 13 and 14, which are shown in the form of contacts. These gate circuits are controlled by a signal H' produced by a sequencing circuit 29 for storing in memory 12 each pair of samples $S_r$ and $S_i$ produced by circuits 8 and 9. Sequencing circuit 29 receives pulses from time base 11 and supplies all the other control signals necessary for the operation of the arrangement. Memory 12 is dimensioned for storing pairs of samples $S_r$ and $S_i$ of which there are as many as the number n of bits of the synchronizing word. These stored samples $S_r$, $S_i$, may be in the analog or the digital form, depending on the technique employed in the arrangement, Diagram 3a in FIG. 3 shows two consecutive pulses of the signal H' which are separated by the period T of the sampling operation effected in circuits 8 and 9. Let it be assumed for the moment that this period is the same as the modulation period T.

The whole method of correcting the frequency of the local carrier must be performed completely during this period T, after each new pair of samples has been entered into memory 12. To that end, memory 12 receives a fast read clock signal h having a frequency which is sufficient to ensure that during the period T there appear at two outputs of the memory as many sequences of n samples $S_r$ and n samples $S_i$ as is necessary for a complete cycle of the procedure.

The signals x and y appearing at the two outputs of memory 12 are the real and imaginary components of a complex signal z. They are applied to a phase shifter 15, whose object is to have the phase of each sample of each sequence of n samples of the complex signal z shift through a phase angle $\varphi_{VCO}$ corresponding to the frequency correction $f_{VCO}$ produced by the frequency correction circuit at the end of each step. Phase shifter 15 supplies the real and imaginary components X and Y of a complex signal Z, by effecting the calculation:

$$\begin{cases} X = x \cos \varphi_{VCO} + y \sin \varphi_{VCO} \\ Y = y \cos \varphi_{VCO} - x \sin \varphi_{VCO} \end{cases} \quad (9)$$

The quantities $\sin \varphi_{VCO}$ and $\cos \varphi_{VCO}$ used in phase shifter 15 are provided by a read-only memory (ROM) 16 which is addressed by the phase $\varphi_{VCO}$ produced by a phase generator 17 at the rate of the fast clock h. Generator 17 produces the phase $\varphi_{VCO}$ on the basis of the frequency correction $f_{VCO}$ supplied by a frequency correction generator 18.

The samples of the signals X and Y are applied to the correlation calculation circuits 19 and 20 to which also the samples of the real and imaginary components X' and Y' of the local synchronizing word are applied. The n samples of each sequence of X' and Y' are stored in a read-only memory 21 and read at the fast clock rate h, each sequence being reproduced as many times as is necessary for a complete cycle of the procedure. For a transmission system employing phase and amplitude modulation, the n samples X' and Y' reproduce the phase states $\theta_K$ and amplitude states corresponding to n bits of the transmitted synchronizing word; for phase modulation only (of the PSK type), the n samples X' and Y' are simply $\cos \theta_K$ and $\sin \theta_K$.

In correlation calculation circuits 19 and 20 the products of the samples X, X' on the one hand and Y, Y' on the other hand are accumulated. A sampling signal $H_1$ shown in diagram 3b controls the reading operating of the results of the partial correlations in circuits 19 and 20, while a reset-to-zero signal $RAZ_1$ shown in diagram 3c resets the results of the partial correlations to zero immediately after they have been read by means of signal $H_1$. The period of the signals $H_1$ and $RAZ_1$ defines the length of the synchronizing word portions used to calculate the partial correlations. As shown in FIG. 3, this period is different according to whether the procedure is in step 1, 2, 3 or 4.

Calculation circuits 19 and 20 provide the results of the partial correlation $C_r(k)$ and $C_i(k)$, respectively, k defining the order of each partial correlation in each step. Diagram 3d shows that during step 1, 16 results $C_r(k)$, $C_i(k)$ numbered from 0 to 15 are produced; during step 2 eight results numbered from 0 to 7 are produced during step 3 four results numbered from 0 to 3 are produced and during step 4, two results $C_r(k)$ and $C_i(k)$, numbered 0 and 1 are produced.

The successive results of the partial correlations are applied to a calculation circuit 22 which, from the pairs of consecutive partial correlations $C_r(k-1)$, $C_r(k)$ and $C_i(k-1)$, $C_i(k)$ provided at the rate $H_1$, calculates the error terms E, in accordance with expression (5) above.

Each term of the error E depends on the phase deviation $\Delta \varphi$ between two consecutive portions of the synchronizing word used for producing the partial correlations $C_r(k)$, $C_i(k)$ and $C_r(k-1)$, $C_i(k-1)$. As diagram 3e shows, the terms of the calculated error corresponds to phase deviations $\Delta \varphi_1$ during step 1, $\Delta \varphi_2$ during step 2, $\Delta \varphi_3$ during step 3 and finally to a phase deviation $\Delta \varphi_4$ during step 4.

The successive error terms E thus calculated, which take 15 values $E_1$ during step 1, 7 values $E_2$ during step 2, 3 values $E_3$ during step 3 and one value $E_4$ during step 4, are applied to a circuit 23 in which the mean value is taken at the end of the steps 1, 2, 3 and 4. To that end, as shown in diagram 3f, the errors E are accumulated in circuit 23, and the results of the accumulation are reset to zero at the end of each step. This reset-to-zero operation is controlled by a signal $RAZ_2$. The results of the accumulation just before this reset-to-zero operation are divided by the number $N_m$ of the accumulated error terms ($N_m$=15, 7, 3 or 1) so that the result of this division constitutes the mean value of the error terms. The mean value of the error terms, $E_{1m}$, $E_{2m}$, $E_{3m}$, $E_{4m}$=$E_4$, appear at the end of the steps 1, 2, 3, 4, respectively under the control of a sampling signal $H_2$.

Figure 3:
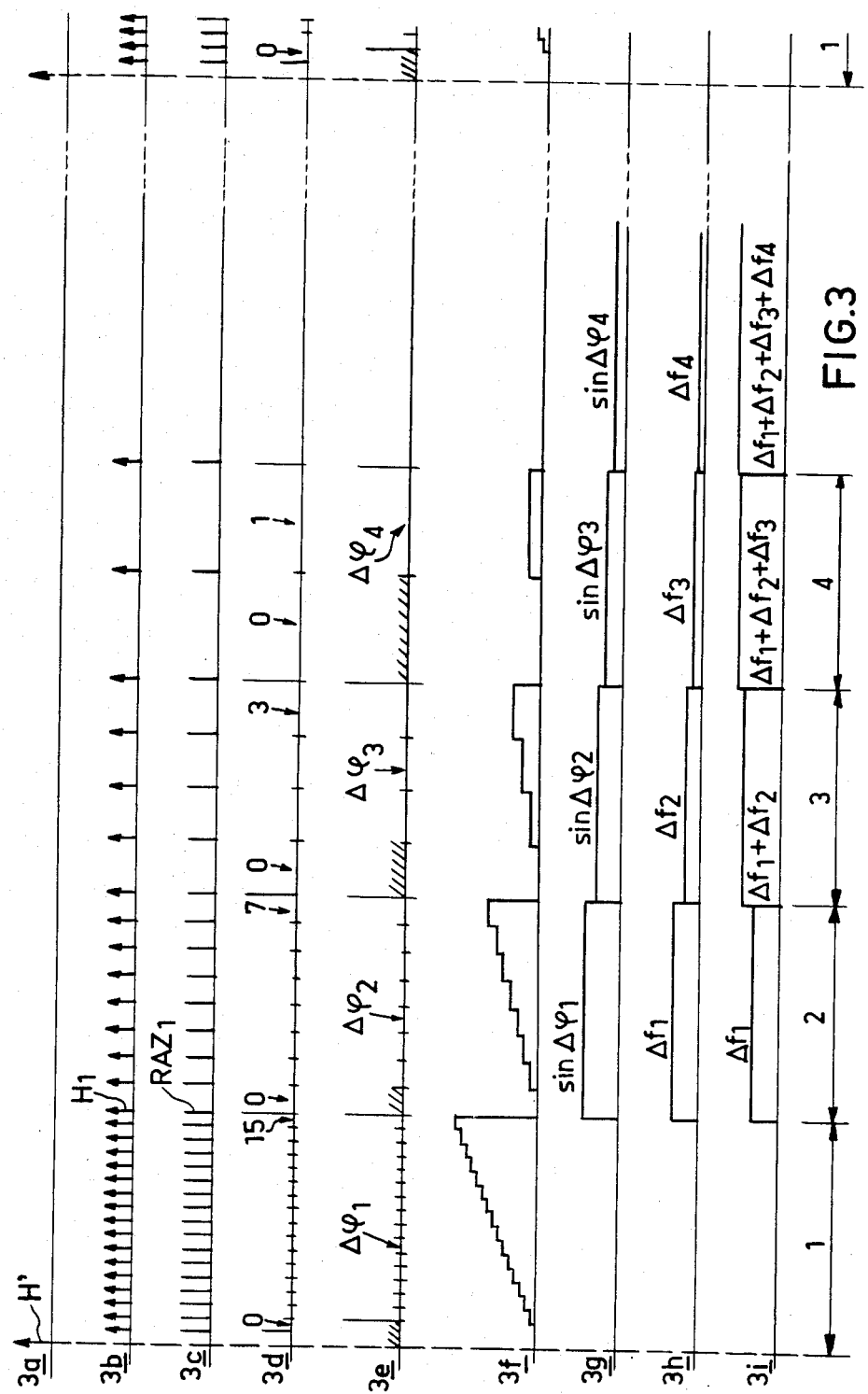
FIG. 3 shows time diagrams for different signals and different magnitudes calculated during the steps of the method according to the invention.
Figure 11:
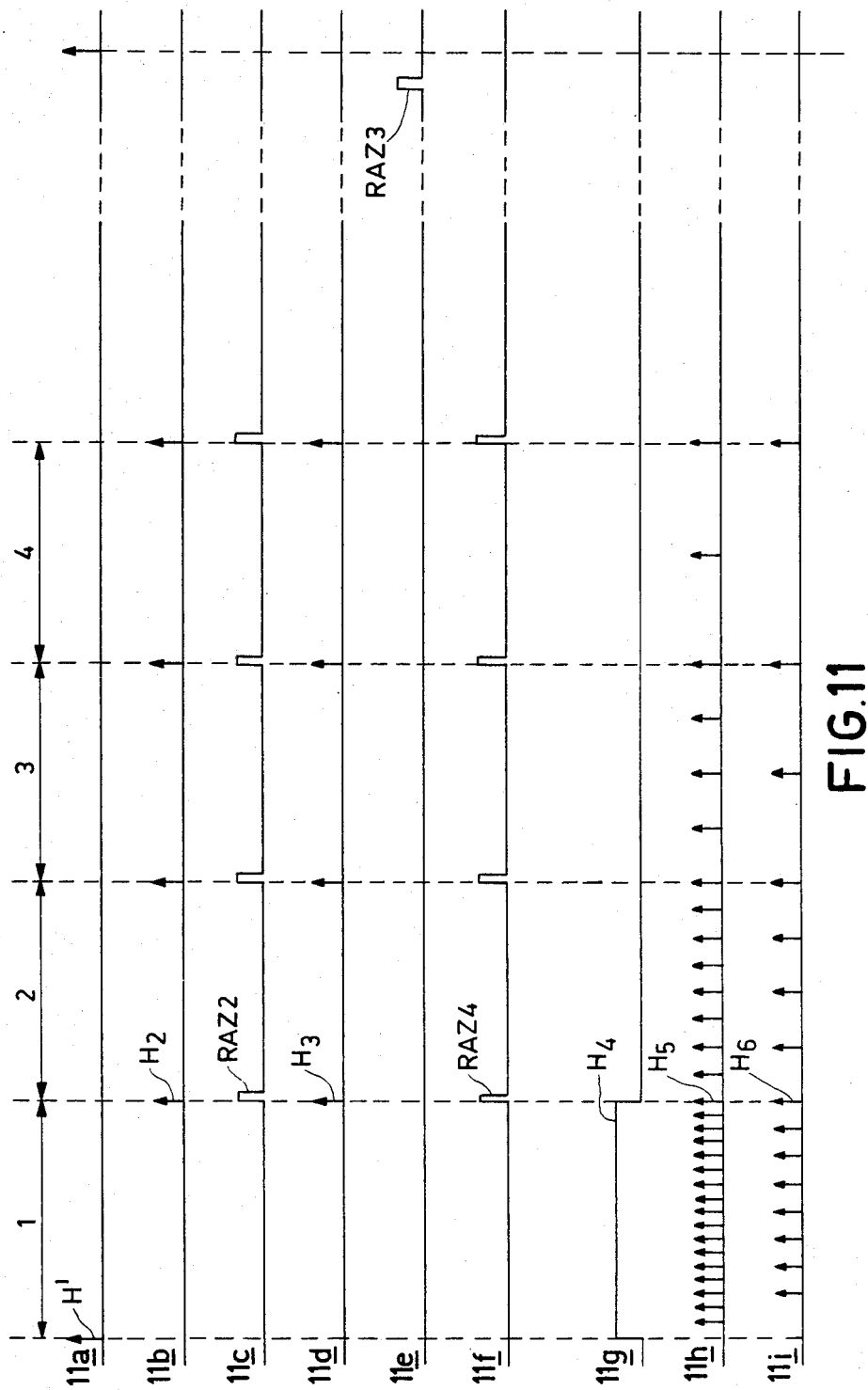
FIG. 11 shows time diagrams which complete the diagrams of FIG. 3 and shows control signals used to employ the method according to the invention as shown in the schematic diagrams of FIGS. 1 and 8.

In FIG. 11 which is intended to complete FIG. 3, the different control signals used in the arrangement in according to the invention are shown. Diagram 11a intended to fix the time scale, represents, as does also diagram 3a, two consecutive pulses of signal H' which are separated by the sampling period T. This diagram 11a also shows the time periods during which the steps 1, 2, 3 and 4 are performed. Diagrams 11b and 11c represent the pulses of sampling signal $H_2$ and reset-to-zero signal $RAZ_2$, respectively, these signals which are applied to circuit 23 performing the above-described functions by means of pulses which are produced at the end of the steps 1, 2, 3 and 4.

The mean error terms produced in circuit 23 are applied to a circuit 24 to have their level corrected, in order to obtain corrected error terms $E^*_1$, $E^*_2$, $E^*_3$, $E^*_4$ which are substantially equal to sin $\Delta\varphi_1$, sin $\Delta\varphi_2$, sin $\Delta\varphi_3$, sin $\Delta\varphi_4$. Diagram 3g shows that these quantities appear successively at the end of the steps 1, 2, 3 and 4.

For the correction of this level, the sums of the squares of the results of the partial correlations produced by circuits 19 and 20 can be advantageously accumulated, while the result of the accumulation is reset to zero at the end of each step by means of signal $RAZ_2$. The level-corrected error terms are obtained by dividing the mean error terms calculated in circuit 23 by the results of the accumulation formed in circuit 24 as described just now. The corrected errors appear at the output of circuit 24 under the control of sampling signal $H_2$.

The corrected errors $E^*$ are applied to a circuit 25 which has for its object to determine the frequency deviation measured at the end of each step. To that end, this circuit first comprises means to determine the phase deviations $\Delta\varphi$ as a function of the corrected errors $E^*$. For this purpose a read-only memory can be used in which the quantities $\Delta\varphi = $ arc sin $E^*$ are stored, reading of this memory being effected by the addresses formed by the terms $E^*$. It is alternatively possible to obtain the phase deviations by means of calculation, by using simple approximations of the function $\Delta\varphi = $ arc sin $E^*$. From the phase deviations $\Delta\varphi_1$, $\Delta\varphi_2$, $\Delta\varphi_3$, $\Delta\varphi_4$, determined for each step, circuit 25 determines the corresponding frequency deviations $\Delta f_1$, $\Delta f_2$, $\Delta f_3$, $\Delta f_4$ by using the above relation (8). To apply this formula, the number of bits b to be considered for the steps 1, 2, 3 and 4 is n/16, n/8, n/4, n/2, respectively, n being the total number of bits of the synchronizing word. Diagram 3h shows the time intervals following after the steps 1, 2, 3 and 4, during which intervals the frequency deviations $\Delta f_1$, $\Delta f_2$, $\Delta f_3$, $\Delta f_4$ are obtained.

These measured frequency deviations are applied to circuit 18 in which they are accumulated during each period T, the result of the accumulation being reset to zero at the end of each period T by a reset-to-zero signal $RAZ_3$ shown in diagram 11e. At the end of each step the result of the accumulation is read with the aid of sampling signal $H_3$. Thus, circuit 18 acts as a generator supplying a frequency $f_{VCO}$ equal to the frequency correction of the local carrier to be used in each step of the procedure. As diagram 3i shows, this frequency $f_{VCO}$ is successively:

| | |
|---|---|
| $f_{VCO} = 0$ | at the beginning of a period T, during step 1 |
| $= \Delta f_1$ | at the end of step 1, during step 2 |
| $= \Delta f_1 + \Delta f_2$ | at the end of step 2, during step 3 |
| $= \Delta f_1 + \Delta f_2 + \Delta f_3$ | at the end of step 3, during step 4 |
| $= \Delta f_1 + \Delta f_2 + \Delta f_3 + \Delta f_4$ | at the end of step 4, until the end of the period T |

The frequency $f_{VCO}$ supplied by circuit 18 is applied to circuit 17 which produces, at the rate of the fast clock h (used to read the samples x and y in memory 12), the phase shift $\varphi_{vco}$ to which the complex samples of components x and y must be subjected. In correspondance with the above-indicated frequencies $f_{VCO}$, which are also shown in diagram 3i, this phase shift is zero during step 1 and then, after each step 1, 2, 3, 4, increases starting from zero in proportion to $\Delta f_1$, $\Delta f_1 + \Delta f_2$, $\Delta f_1 + \Delta f_2 + \Delta f_3$, $\Delta f_1 + \Delta f_2 + \Delta f_3 + \Delta f_4$. A signal $RAZ_4$ applied to circuit 17 enables $\varphi_{vco}$ to be adequately reset to zero at the end of each step 1, 2, 3, 4. This signal $RAZ_4$ is shown in diagram 11f.

FIGS. 4 to 7 show a possible embodiment for the principal circuits shown in FIG. 1. The circuits and signals having the same functions are given the same references in these figures.

Figure 4:
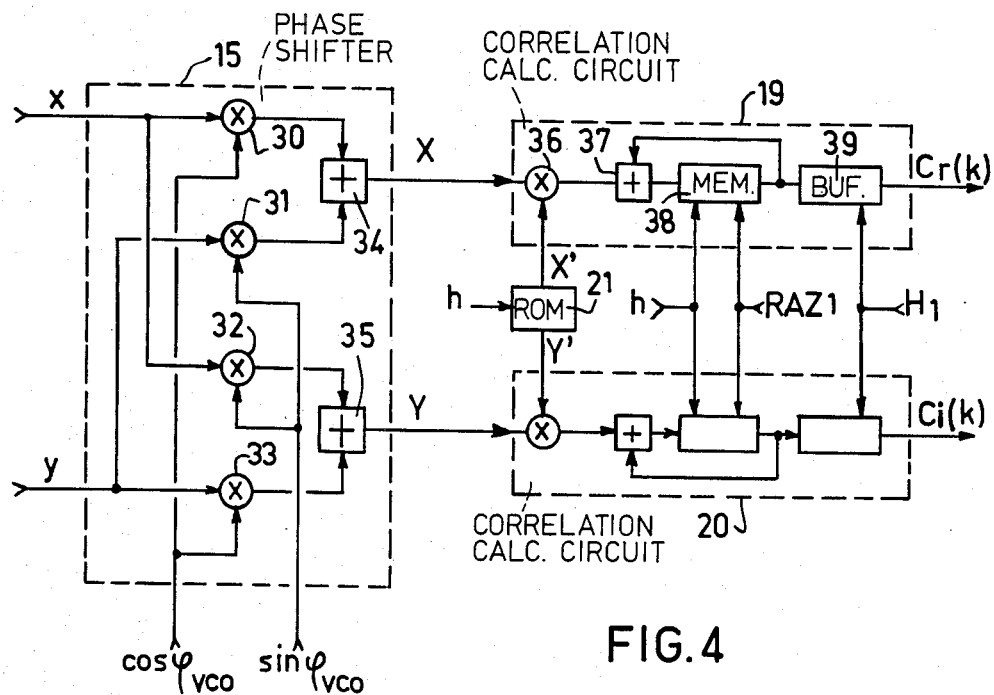
FIG. 4 is a schematic diagram which shows an embodiment of a phase shifting circuit and a correlation calculation circuit used in a receiver employing the method according to the invention.

FIG. 4 shows an embodiment of phase shifter 15 and correlation calculation circuits 19 and 20. Phase shifter 15 comprises multiplying circuits 30–33 and combining circuits 34 and 35, which are interconnected such that they can calculate the signals X and Y from the signals x and y and the quantities cos $\varphi_{vco}$ and sin $\varphi_{vco}$ according to the above formulae (9). Correlation calculation circuits 19 and 20 are identical and operate in the same way. Circuit 19, for example, comprises a multiplying circuit 36 which forms the product of the samples X produced by phase shifter 15 and samples X' coming from read-only memory 21. These products are accumulated in the accumulator constituted by an adder 37 and memory (MEM.) 38, the result of the accumulation appearing in a buffer memory BUF. 39 connected to the output of the accumulator. The accumulation is effected at the rate of the clock h at which the samples X and X' appear. The accumulator is reset to zero by reset-to-zero signal $RAZ_1$, just after the result of the accumulation is sampled in memory 39 by sampling signal $H_1$. The result of the partial correlations $C_r(k)$ appear at the output of memory 39.

Figure 5:
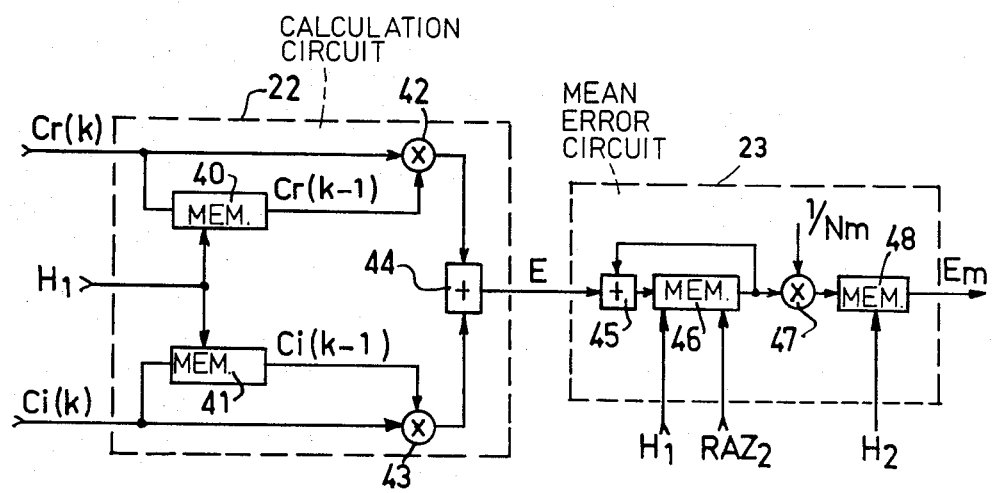
FIG. 5 shows a schematic diagram of the circuits for calculating the quantities E and their mean value.

FIG. 5 shows an embodiment of circuit 22 for calculating the error E and circuit 23 for calculating the mean error $E_m$. Circuit 22 receives the results of the partial correlations $C_r(k)$ and $C_i(k)$. It comprises memories 40 and 41 which store the preceding results $C_r(k-1)$ and $C_i(k-1)$ and, under the control of sampling signal $H_1$, recover the correlation results $C_r(k-1)$ and $C_i(k-1)$ at the same time that the correlation results $C_r(k)$ and $C_i(k)$ appear. All these correlation results are processed by means of multiplying circuits 42, 43 and combining circuit 44, which are arranged such that they calculate the error signal E according to the above formula (5).

Mean value calculating circuit 23 comprises an accumulator constituted by an adder 45 and a memory 46, which accumulates the terms of the error E applied to its input under the control of sampling signal $H_1$. The accumulator is reset to zero by signal $RAZ_2$ at the end of each step. The result of the accumulation is multiplied, just before the accumulator is reset to zero, in a multiplying circuit 47 by the quantity $1/(N_m)$, $N_m$ being the number of the error terms accumulated in each step. The result of the multiplying operation is applied to a memory 48, which is read by mean error sampling signal $H_2$, in such a way that the mean error terms of each step appear just after the end of each step.

Figure 6:
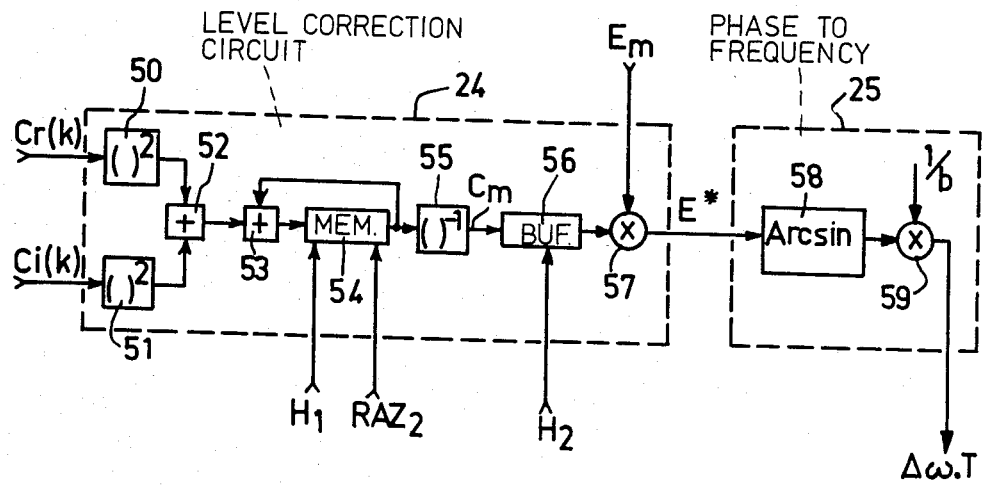
FIG. 6 shows a schematic diagram of the circuits for calculating the corrected quantity E* and a term of the frequency deviation $\Delta f$.

FIG. 6 shows embodiments of circuits 24 and 25. Circuit 24, which has for its object to correct the mean error $E_m$ on the basis of the partial correlation results $C_r(k)$ and $C_i(k)$, comprises squaring circuits 50 and 51 and an adder 52 which are arranged to produce the quantity $$[C_r(k)]^2 + [C_i(k)]^2.$$

The quantities $$[C_r(k)^2 + C_i(k)^2]$$

are accumulated in an accumulator constituted by an adder 53 and a memory 54. The accumulation is effected at the rate of partial correlation sampling signal $H_1$; memory 54 is reset to zero by control signal $RAZ_2$ at the end of each step. The output of the accumulator is connected to a circuit 55 which produces the inverse value of the contents of the accumulator; this inverse value is the correction factor $C_m$ to be applied to the mean error term $E_m$. The factor $C_m$ is applied to a buffer memory 56, from which it is read by control signal $H_2$ and applied to a multiplying circuit 57, to which also the mean error $E_m$ is applied which is read from memory 48 by the same control signal $H_2$. Circuit 57 thus supplies the corrected error term $E^*$.

Circuit 25, which has for its object to supply the frequency deviation calculated at the end of each step, comprises, for example, a read-only memory 58 from which the phase deviations $\Delta\varphi$ are read in response to addresses formed by the corrected errors $E^*$. The quantities $\Delta\omega T$ are obtained in accordance with formula (8) by means of a multiplying circuit 59 which, from the phase deviation $\Delta\varphi$ and the inverse of the number of bits b of the synchronizing word portions, forms the products $\Delta\varphi/b = \Delta\omega \cdot T$. As the quantities $\Delta\omega \cdot T$ are proportional to the frequency deviations $\Delta f$, it is not necessary to calculate these frequency deviations.

Figure 7:
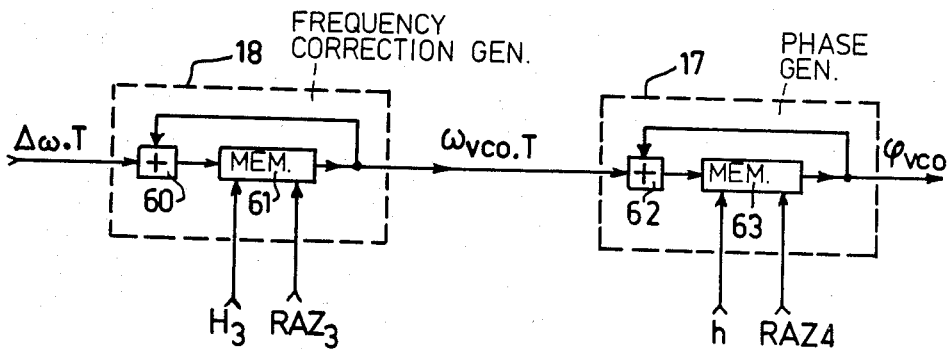
FIG. 7 shows a schematic diagram of the circuits for calculating the magnitude of the frequency correction $f_{VCO}$ and the phase correction $\varphi_{VCO}$.

FIG. 7 shows embodiments of circuits 18 and 17. Circuit 18 comprises an accumulator which is constituted by an adder 60 and a memory 61 and which, under the control of sampling signal $H_3$, accumulates the quantities $\Delta\omega T$ obtained at the end of the steps of the procedure. Memory 61 is reset to zero by signal $RAZ_3$ at the end of each period T, so that its content is zero at the beginning of the subsequent period. Thus, the output of accumulator circuit 18 produces the quantity $\omega_{VCO} \cdot T$ which is proportional to the frequency correction $f_{VCO}$.

Circuit 17 comprises an accumulator which is constituted by an adder 62 and a memory 63 and accumulates the quantities $\omega_{VCO}T$ at the rate of the fast clock h. Memory 63 is reset to zero by signal $RAZ_4$ at the end of each step. As clock h also provides the reading rate of the samples x and y from memory 12, the output of the accumulator simulates the phase shift $\varphi_{VCO}$ to which the complex samples of components x and y must be subjected to compensate for the frequency deviation of the local carrier relative to the received carrier.

According to a variation of the invention which will now be described, it is possible to use during each sampling period T a method which, as regards time, is faster than the method illustrated in the schematic diagram of FIG. 1, In accordance with this variation which is applied to, for example, the 4-step procedure described in the foregoing, the partial correlations for the steps 2, 3, 4 are determined on the basis of the partial correlations calculated during the first step, which also here are formed on the basis of n pairs of samples x and y read from memory 12 and n pairs of samples X' and Y' read from the memory 21. Thus, it is not necessary to reread in each step 2, 3, 4 these n pairs of samples from memories 12 and 21.

The method used to obtain the partial correlations for the steps 2, 3, 4 consists in adding pair-wise the partial correlations calculated during the respective preceding steps 1, 2, 3. However, before this adding operation is effected, the phase correction of the partial correlations calculated during the preceding phases must first be effected, by using the frequency deviation just estimated.

Figure 8:
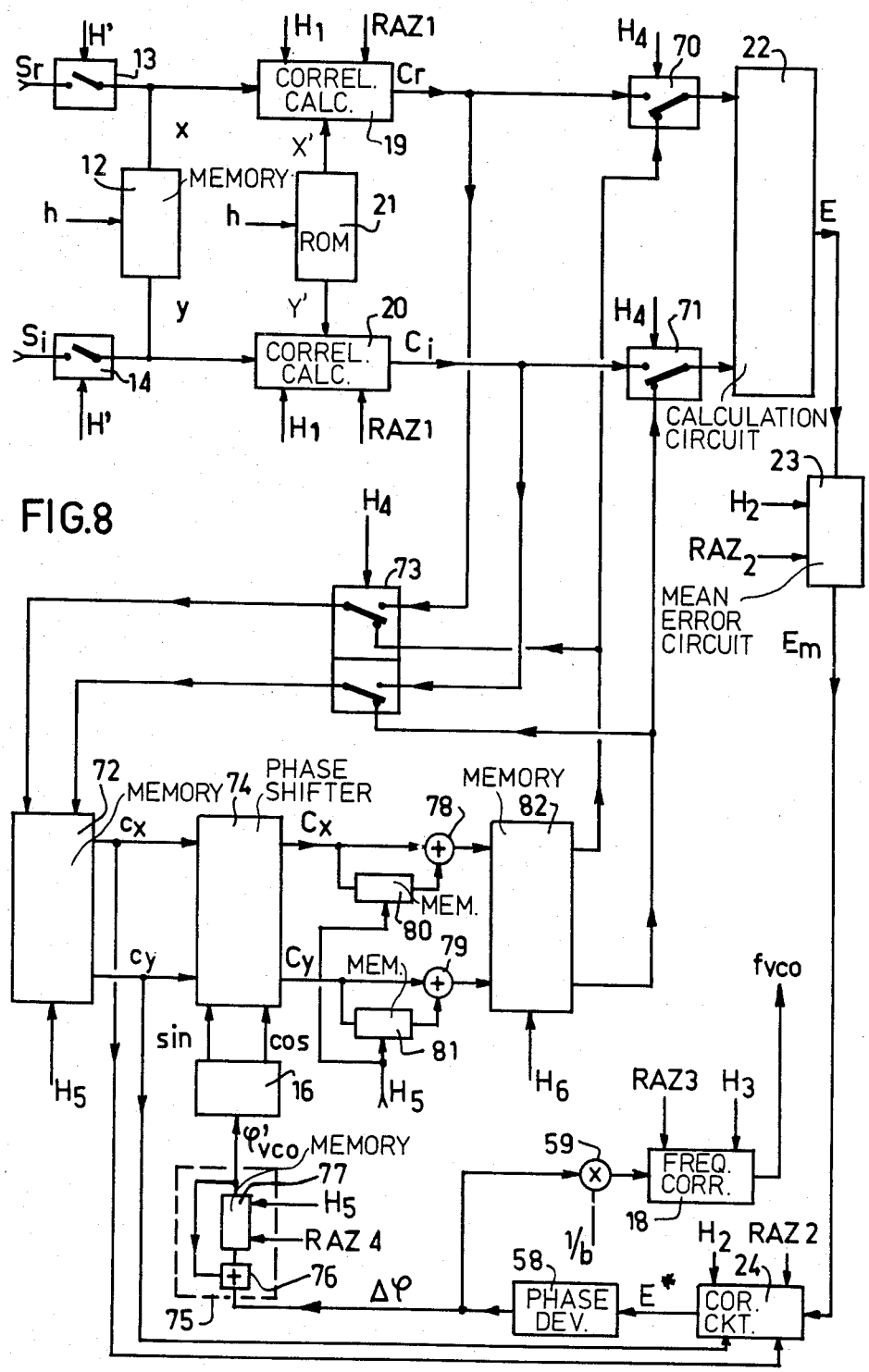
FIG. 8 is a schematic diagram which shows, in accordance with a variant differing from FIG. 1, how the method according to the invention can be employed in the receiver of a data transmission system.

The schematic diagram of FIG. 8 shows how this variation of the method according to the invention can be realized, while for its operation it is possible to use the diagrams already described with reference to FIGS. 3 and 11, in combination with the diagrams 11g, 11h and 11i of FIG. 11.

The schematic diagram of FIG. 8 shows how this variation of the method according to the invention can be realized. Elements having the same function as in FIG. 1 are given the same reference numerals in FIG. 8, in which there is shown memory 12 which, as explained above, receives in each period T a pair of samples $S_r$, $S_i$ via gates 13 and 14 and has a capacity of n pairs of samples. The samples x, y read from memory 12 at the fast clock rate h are directly applied to correlation calculating circuits 19 and 20, simultaneously with the n pairs of samples X', Y' of the local synchronizing word, which are also read at the clock rate h. To calculate the partial correlations in circuits 19 and 20, control signals $H_1$ and $RAZ_1$ which are identical to the control signals used in the circuit diagram of FIG. 1 and shown in the diagrams 3b and 3e can be used. But actually, in the further course of the schematic diagram, from all partial correlations produced by circuits 19 and 20 only those partial correlations produced during step 1 are used. To that end, the outputs of circuits 19 and 20 are connected to circuit 22 for calculating error E only during step 1 by means of switches 70 and 71 which are set to the suitable position by a control signal $H_4$ shown in diagram 11g. The outputs of circuits 19 and 20 are also connected to the input of a memory 72 by means of a switch 73 which is also controlled by control signal $H_4$ such that memory 72 stores the partial correlations processed during step 1.

The partial correlations produced in the course of step 1 are used to calculate, as explained for the variation of FIG. 1, to calculate the errors $E_1$ in circuit 22 and thereafter the average error $E_{1m}$ in circuit 23. The 16 partial correlations calculated during step 1 and stored in memory 72 are read therefrom during step 2 by a control signal $H_5$, which is shown in diagram 11h. These correlations are used in correction circuit 24, which has the same function as correction circuit 24 of FIG. 1, to correct the average error $E_{1m}$ which also appears during step 2. The corrected error $E^*_1$ is applied to circuit 58 which determines the phase deviation $\Delta\varphi_1$ corresponding to the partial correlations produced during step, 1, by using the relation $\Delta\varphi_1 = \arc\sin E^*_1$. The 16 pairs of partial correlations of step 1, which are read from the memory 72, are also applied to a phase shifter 74 to be corrected by the phase $\varphi'_{vco}$. When the pairs of partial correlations applied to phase shifter 74 are denoted by $c_x$ and $c_y$, phase shifter 74 produces sequences of phase-corrected partial correlations $C_x$ and $C_y$ by effecting the calculations:

$$C_x = c_x \cos \varphi'_{vco} + c_y \sin \varphi'_{vco}$$

$$C_y = c_y \cos \varphi'_{vco} - c_x \sin \varphi'_{vco}$$

The quantities $\sin \varphi'_{vco}$ and $\cos \varphi'_{vco}$ are read from read-only memory 16 by means of the phase $\varphi'_{vco}$ produced by a phase generator 75. This phase generator is constituted by an accumulator which comprises an adder 76 and a memory 77 and which, at the rate of control signal $H_5$, accumulates the phase deviation $\Delta\varphi$ produced by circuit 58 and is reset to zero by signal RAZ$_4$ at the end of each step. In this way, the 16 pairs of partial correlations applied during step 2 to phase shifter 74 are phase-corrected therein by the phase $\varphi'_{vco1}$ obtained by accumulation of the phase deviation $\Delta\varphi_1$.

Each pair of the 16 partial correlations corrected by the phase $\varphi'_{vco1}$ is applied to adder 78, 79 to be added to the preceding pair of partial correlations which were read from memories 80 and 81 by means of control signal H$_5$. The sums supplied at the output of circuit 78 and 79 are written into a memory 82 by a control signal H$_6$, which is shown in diagram 11$i$ and has a rate which is half the rate of control signal H$_5$, such that this memory 82 stores the 8 pairs of partial correlations produced during step 2 starting from the 16 pairs of partial correlations of step 1.

These 8 pairs of partial correlations of step 2 are read from memory 82 at the rate of control signal H$_6$ and are applied on the one hand, via switches 70 and 71, to circuit 22 which calculates the 8 errors E$_2$ of step 2 and on the other hand, via switch 73, to memory 72 to be stored therein until they are again read from the memory by control signal H$_5$ in the course of step 3.

During step 3 the procedure already described for step 2 is repeated and the following calculations are effected: the average error E$_{2m}$, the corrected error E*$_2$, the phase deviation $\Delta\varphi_2$, the phase $\varphi'_{vco2}$ which is used to correct the phase of the 8 partial correlations read from memory 72, and finally the pair-wise sums of the corrected partial correlations are calculated; four of these sums are written into memory 82 and are used in the same way.

During step 4 also the phase deviation $\Delta\varphi_3$ and the phase $\varphi'_{vco3}$ are determined which are used to correct the phases of the 4 partial correlations read from memory 72. Finally, during this step 4, two pairs of phase-corrected partial correlations are written into memory 82.

These two pairs of partial correlations render it possible to determine the phase deviation $\Delta\varphi_4$ at the end of step 4. This phase deviation $\Delta\varphi_4$ may be used to calculate the phase $\varphi'_{vco4}$ which is used to correct the phases of the two partial correlations read from memory 72 and to form in memory 82 a complete phase-corrected correlation between the local synchronizing word and the received demodulated signal. As has already been described, this complete correlation may be employed for the sampling clock synchronization and the frame synchronization.

It should be noted that in the embodiment shown in FIG. 8, the phases $\varphi'_{vco1}$, $\varphi'_{vco2}$, $\varphi'_{vco3}$, $\varphi'_{vco4}$, which are used to correct the phases of the partial correlations of each step 1, 2, 3 and 4, are obtained directly from the calculated phase deviations $\Delta\varphi_1$, $\Delta\varphi_2$, $\Delta\varphi_3$, $\Delta\varphi_4$, while in the embodiment shown in FIG. 1 the phases used to correct the samples read from memory 12 are obtained from the accumulated frequency deviations, namely $\Delta f_1$, $\Delta f_1+\Delta f_2$, $\Delta f_1+\Delta f_2+\Delta f_3$, $\Delta f_1+\Delta f_2+\Delta f_3+\Delta f_4$. As in the two embodiments it is always necessary to have the disposal of the total accumulated frequency deviation $\Delta f_1+\Delta f_2+\Delta f_3+\Delta f_4$, which constitutes the frequency $f_{VCO}$ used to correct the local carrier at the end of the procedure, the arrangement of FIG. 8 must be provided with means to process this frequency $f_{VCO}$. To that end, the phase deviations $\Delta\varphi$ supplied by circuit 58 are processed in the manner as described with reference to FIGS. 6 and 7. The phase deviations $\Delta\varphi=b\Delta\omega T$ are applied to multiplying circuit 59 to be multiplied there by 1/b. The quantities $\Delta\omega T$ which are proportional to the frequency deviations $\Delta f$ are accumulated in circuit 18 which supplies at the end of step 4 the quantity $\omega_{VCO}T$ which is proportional to the frequency correction $f_{VCO}$.

It will now be described how the frequency searching arrangement according to the invention is used for searching frame synchronization and sampling clock synchronization. For that specific use the complete correlation between the n samples of the local synchronizing word and the n last samples of the received signal is calculated at the end of the frequency-correction procedure, it being possible to obtain this complete correlation, as explained in the foregoing, equally well in the embodiment shown in FIG. 1 as in the embodiment shown in FIG. 8.

The principle on which the search for frame synchronization is based will be described with reference to the diagrams 9$a$ and 9$b$ of FIG. 9. Diagram 9$a$ shows as a function of the time the complete correlation function C, determined in a continuous way, by assuming that clock synchronization has been acquired. In this case, the correlation function C shows a peak, at one of the sampling clock instants of period T, which are indicated by the graduations of the time axis. The function C has the value 1 at the instant $t_o$ of this peak and the value $-1/n$, if, for example, the synchronizing word is a maximum-length sequence. The instant $t_o$ of the peak indicates the instant at which the n preceding samples of the received signal constitute the transmitted synchronizing word. To obtain approximately the instant $t_o$ of the correlation peak and thus to obtain frame synchronization, it is sufficient to compare the correlation function to a threshold S$_e$. Diagram 9$b$ represents the complete correlation C$_e$ determined from the signals sampled with the period T of the sampling clock, as is actually done in the arrangement according to the invention. As it is assumed in diagram 9$b$ that clock synchronization has been acquired, the instant $t_o$ of the correlation peak is unambiguously obtained by comparing the correlation C$_e$ obtained from the sampled signals to a threshold S$_e$.

When bit clock synchronization has not been acquired, it is possible to acquire it at the same time as the frame synchronization, on the condition that the received signal is oversampled with a frequency which is a multiple of the modulation rate 1/T. When this multiple frequency is j/T, the frequency correction arrangement may be similar, but may process, in time sharing, j signals sampled with the period T and interleaved, to arrive at the end of the frequency correction procedure at j frequency correction values $f_{VCO}$ and finally at j complete correlations which correspond to the said respective j interleaved signals. Diagram 9$c$ shows the correlation C$_{es}$ which is the image of the correlation function C of diagram 9$a$ and which is obtained with a sampling frequency 4/T. By comparing the correlation C$_{es}$ to a threshold S$_e$, frame synchronization is obtained, while by detecting the position, within the period T, of the sample which leads to the maximum correlation, sampling clock synchronization is obtained. At the same time, from the j available frequency corrections $f_{VCO}$, that correction is selected which corresponds to the sampling clock obtained and which will be used during the data transmission subsequent to the synchronizing period.

The search procedure for sampling clock synchronization and frame synchronization described in the foregoing can be realized by using the correlation calculation means of the embodiments shown in FIG. 1 and 8. The real and imaginary components $C_i$ and $C_r$ of the complete correlations which can be obtained after the frequency search procedure are, for example, applied to squaring circuits, the squared quantities obtained are applied to an adder forming a sum which is compared to a threshold, the instant at which this threshold is exceeded providing frame synchronization and sampling clock synchronization.

Once carrier, sampling clock and frame synchronization have been acquired, by using the arrangement according to the invention, this arrangement is no longer useful and the receiver is given a configuration, as shown in FIG. 10, by means of which the data can be recovered. In FIG. 10, a part of the components of FIG. 1 are used and provided with the same reference numerals. The bit clock generator 10 has been arranged in the configuration in which it is capable of supplying the frequency $1/\%$ with the phase found at the end of the synchronizing period. The samples $S_r$, $S_i$ supplied by analog-to-digital converters 8 and 9 at this rate $1/T$, are applied directly to a phase shifter which may be the same phase shifter as is used in the frequency correction arrangement according to the invention. In phase shifter 15, the phases of the samples of the components $S_r$, $S_i$ are corrected by using the components $\sin \Psi_{VCO}$ and $\cos \Psi_{VCO}$ read from memory 16 with the aid of the phase $\Psi_{VCO}$ produced by phase generator 85. Phase shifter 15 supplies samples $e_r$, $e_i$ which are the result of a calculation operation similar to that indicated by the formulae (9). The phase $\Psi_{VCO}$, which differs from the phase $\varphi_{VCO}$ or $\varphi'_{VCO}$, must correspond to the phase which, at the instants which are a multiple of T from the initial instant $t_o$, an oscillator having the frequency $f_{VCO} = \Delta f_1 + \Delta f_2 + \Delta f_3 + \Delta f_4$ found at the end of the synchronizing period would have. This phase $\Psi_{VCO}$ is obtained with the aid of an accumulator constituted by an adder 86 and a memory 87. In memory 87 the frequency $f_{VCO}$ (or a proportional quantity) stored in memory 88, is accumulated at the accumulation rate $1/T$, starting from the initial instant $t_o$ determined by a signal $RAZ_o$. The corrected samples $e_r$, $e_i$ produced by phase shifter 15 are applied to a decision circuit 89 which recovers the data D. During data transmission, the frequency $f_{VCO}$ might inter alia be controlled by means of a control loop, which enables the synchronization of the carrier to be maintained and which has no relationship whatsoever with the arrangement according to the invention which is only used to acquire this synchronization.

In the foregoing, the way in which the procedure according to the invention is used is described for an implementation with wired circuits. But it will be obvious that it is alternatively possible to realize it in its different forms by means of a microprocessor associated with memories and controlled by a program for the execution of all the required functions. These functions have been sufficiently explained to enable a person skilled in logic techniques to set up such a program.

What is claimed is:

1. A method for correcting the frequency of a local carrier in a receiver of a data transmission system in which data are transmitted by carrier modulation and a receiver synchronizing word is transmitted before the data, said receiver comprising means for demodulating a received signal with the aid of signals in phase and in quadrature with a local carrier, means for sampling the in-phase and quadrature demodulated signals with a sampling frequency equal to the modulation rate, each new pair of in-phase and quadrature samples thus formed being written into a received-signal memory, the receiver further comprising a synchronizing-word memory containing in-phase and quadrature samples of a local synchronizing word which is identical to the transmitted synchronizing word, the method comprising:

effecting at least once during each sampling period the synchronized reading of n pairs of samples contained in the synchronizing word memory and n pairs of samples written last into the received-signal memory in order to determine in P steps ($P \geq 1$) the magnitude of the frequency correction to be effected on the local carrier;

during each step calculating from said read samples at least one pair of in-phase partial correlations $C_r(k-1)$, $C_r(k)$ and at least one pair of quadrature partial correlations $C_i(k-1)$, $C_i(k)$, the partial correlations of order $(k-1)$ and $(k)$ in each step employing two consecutive portions of the same length of the local synchronizing word, the partial correlations of each step of the order of $p > 1$ using portions of the synchronizing word of a length which exceeds the length of the portions used during the preceding step of the order $p-1$, the partial correlations of the step of the order $p$ being calculated while taking account of the frequency correction calculated at the end of the preceding step $p-1$;

during each step calculating at least one quantity $E = C_r(k-1) \cdot C_i(k) - C_i(k-1) \cdot C_r(k)$ which is corrected as a function of the level of the received signal so as to supply a corrected quantity $E^*$, which is a predetermined function $$E^* = \sin \Delta\varphi \cdot \left[ \frac{\sin \frac{\Delta\varphi}{2}}{b \sin \frac{\Delta\varphi}{2b}} \right]^2$$

of the phase deviation $\Delta\varphi$ produced by the frequency deviation $\Delta f$ between the local carrier and the received carrier, during a time interval corresponding to the number of bits b which form the length of the said portions of the synchronizing word;

at the end of each step $p \geq 1$ calculating from at least one corrected quantity $E^*$, which is formed during the step and which is of the same length as the portions of the synchronizing word used during the step, the frequency deviation $\Delta f_p$, and thereafter forming the sum $$\sum_{i=1}^{p} \Delta f_i$$

which constitutes an estimate of the magnitude of the frequency correction, this estimate at the end of the step P being the final value to be retained for the magnitude of the frequency correction to be effected on the local carrier.

2. A frequency correction method as claimed in claim 1 comprising at least one step during which several pairs of in-phase partial correlations and several pairs of quadrature partial correlations are calculated which are used to calculate several quantities E and wherein at the end of this step the mean value of the said quantities E is calculated, this mean value being corrected as a function of the level of the received signal for forming the said corrected value E* which is used to calculate the frequency deviation $\Delta f_p$ at the end of each step p.

3. A frequency correction method as claimed in any one of the claims 1 and 2 wherein each quantity E calculated during a step (or the mean value of the quantities E calculated during the step) is corrected by dividing the said quantity E (or the said mean value) by a term equal to the sum of the squares of the in-phase partial correlations and the quadrature partial correlations which were used to calculate the said quantity E (or by a term equal to the sum of the squares of the in-phase partial correlations and the quadrature partial correlations which were used to calculate the said mean value) so that the corrected quantity E* becomes the function $E^* = \sin \Delta\varphi$ of the phase deviation $\Delta\varphi$, the quantity E* being used to determine the frequency deviation $\Delta f_p$ at the end of each step p.

4. A frequency correction method as claimed in any one of the claims 1 to 3 wherein the length of the synchronizing word portions used during the step of order P is half the length of the synchronizing word, the length of the synchronizing word portion used during a step of order p ($1 < p \leq P$) is double the length of the portions used during the step of order p−1, and the length of the synchronizing word portions used during step 1 is determined by the maximum frequency correction foreseen.

5. A frequency correction method as claimed in any one of the claims 1 to 4 wherein during each sampling period, synchronized reading of the n pairs of samples contained in each of the said memories is effected P times, each reading operation generating a step for the determination of the magnitude of the frequency correction, the amount of the frequency correction determined at the end of the step p−1 during the calculation of the partial correlations of the step p being taken by performing, on the pairs of samples read from the received-signal memory for the step p, a phase correction corresponding to the magnitude of the frequency correction $$\sum_{i=1}^{p-1} \Delta f_i$$

determined at the end of step p−1, this phase correction being zero for the pairs of samples read for step 1.

6. A frequency correction method as claimed in any one of the claims 1 to 4 wherein during each sampling period synchronized reading of the n pairs of samples contained in each of the said memories is effected once, this reading operation generating step 1 for the determination of the magnitude of the frequency correction, the partial correlations of step 1 being calculated directly from the said read samples, each of the partial correlations of a step p > 1 being calculated by forming the sum of two partial correlations of the order (k−1) and (k) calculated during the preceding step p−1 and subjected to a phase correction corresponding to the frequency deviation $\Delta f_{p-1}$ determined at the end of step p−1.

7. A receiver for use in a data transmission system of the kind using a frequency correction method as claimed in claim 5 comprising:

reading clock means h controlled to effect P times synchronized reading of n pairs of in-phase samples x and quadrature samples y stored in a received-signal memory and n pairs of in-phase samples X' and quadrature samples Y' stored in a synchronizing-word memory;

calculating means to form from each pair of samples x, y, the samples X, Y such that $X = x \cos \varphi_{vco} + y \sin \varphi_{vco}$ $y = y \cos \varphi_{vco} + x \sin \varphi_{vco}$ $\varphi_{vco}$ being a term of a phase correction corresponding to the said pair of samples x, y;

calculating means t form from the samples X, X' and Y, Y' at least one pair of in-phase partial correlations and at least one pair of quadrature partial correlations;

calculating means to form from the said partial correlations a quantity E or the mean value of several quantities E;

calculating means to form a quantity E* equal to the corrected value of the quantity E or the mean value of several quantities E;

means to determine a phase deviation term $\Delta\varphi$, by using, in accordance with the correction effected, at least one of the relations:

$$E^* = \sin \Delta\varphi \cdot \left[ \frac{\sin \frac{\Delta\varphi}{2}}{b \sin \frac{\Delta\varphi}{2b}} \right] \cdot E^z = \sin \Delta\varphi$$

or an approximation of these relations:

means to divide the phase deviation by a term which indicates the length of the portions of the synchronizing word used during the step under consideration and to obtain thus a frequency deviation term $\Delta f$;

phase accumulator means to accumulate the phase deviation terms $\Delta f$, means to reset the contents of the phase accumulator means to zero at the beginning of each sampling period in order to obtain at the end of each step p a frequency correction term $f_{VCO}$, and at the end of the last step P the final frequency correction; and frequency accumulator means to accumulate the frequency correction term $f_{VCO}$ at an accumulation rate which is equal to the rate of the said reading clock h, the contents of the frequency accumulator means being reset to zero at the beginning of each step p, in order to obtain the phase correction terms $\varphi_{vco}$ at the rate of the reading clock h.

8. A receiver for use in data transmission system of the kind using a frequency correction method as claimed in claim 6 comprising:

reading clock means h controlled to effect once synchronized reading of n pairs of in-phase samples x and quadrature samples y stored in a received signal memory and n pairs of in-phase samples X' and quadrature samples Y' stored in a synchronizing-word memory;

calculating means to form during step 1, from the said read samples, x, X' and y, Y', at least one pair of in-phase partial correlations and at least one pair of quadrature partial correlations;

first switching means to apply to the calculating means forming a quantity E or the mean value of several quantities E, either the in-phase partial correlations and quadrature partial correlations formed during step 1, or the said partial correlations formed during a step $p>1$;

second switching means to apply to a partial correlation memory either the in-phase partial correlations and quadrature partial correlations formed during step 1, or the said partial correlations formed during each step $p>1$;

means to form the partial correlations during each step $p>1$, comprising:

a. reading clock means $H_5$ to read the in-phase partial correlations $c_x$ and quadrature partial correlations $c_y$ stored in the said partial correlation memory, at the rate at which they are written into the said memory:

b. calculating means to form from each pair of partial correlations $c_x$, $c_y$ the partial correlations $C_x$, $C_y$ such that:

$C_x = c_x \cos \varphi'_{vco} + c_y \sin \varphi'_{vco}$ $C_y = c_y \cos \varphi'_{vco} - c_x \sin \varphi'_{vco}$ $\varphi'_{vco}$ being a phase correction term corresponding to the said pair of partial correlations $c_x$, $c_y$;

c. means to form at a rate $H_6$ which is half the clock rate $H_5$, the sums of the pairs of consecutive partial correlations, $C_x$, and the sums of the consecutive pairs of partial correlations, $C_y$, the said sums forming the partial correlations to be used during the following step $p+1$ which are applied, via the second switching means, to the said partial correlation memory and, via the first switching means, to the said calculating means which produce a quantity E or the mean value of several quantities E;

calculating means to form a quantity $E_x$ equal to the corrected value of the quantity E or the mean value of several quantities E;

means for determining a phase deviation term by using, in accordance with the correction effected, at least one of the relations:

$$E^* = \sin \Delta\varphi \left[ \frac{\sin \frac{\Delta\varphi}{2}}{b \sin \frac{\Delta\varphi}{2b}} \right]^2$$

or an approximation of these relations:

means to accumulate the phase deviation terms $\Delta\varphi$ at an accumulation rate equal to the reading clock rate $H_5$ of the partial correlations from the said partial correlation memory, the accumulator being reset to zero at the beginning of the steps $p \geqq 1$ so as to obtain at the output of the accumulator, at the rate of the said clock $H_5$, the phase correction terms $\varphi'_{vco}$;

means to divide the phase deviation terms $\Delta\varphi$ by a term indicating the length of the synchronizing word portions used during the step under consideration and to obtain thus a frequency deviation term $\Delta f$; and means to accumulate the frequency deviation terms $\Delta f$, the contents of the accumulator being reset to zero at the beginning of each sampling period in order to obtain at the end of the last step P the frequency correction to be effected on the local carrier.

9. A receiver as claimed in any one of the claims 7 or 8 wherein the means provided in the receiver for forming the partial correlations until the last step P are inter alia controlled, taking account of the final frequency correction calculated at the end of step P, in order to form the complete in-phase and quadrature correlations relating to the total length of the synchronizing word, additional means being provided to form the sum of the squares of the said in-phase and quadrature complete correlations and for comparing this sum to a threshold, exceeding of this threshold indicating at the same time the acquisition of frame synchronization and the frequency correction to be effected on the local carrier for the transmission of data following this acquisition of frame synchronization.

10. A receiver as claimed in claim 9 wherein the received demodulated signal is sampled with a sampling frequency $j/T$ which is a multiple of the modulation rate $1/T$, so as to form $j$ sampled signals having the period T and being interleaved, characterized in that the means provided in the receiver for forming the magnitude of the frequency correction and thereafter the sum of the squares of the complete in-phase and quadrature correlations are used in time sharing for each one of the said $j$ interleaved signals, the $j$ sums of the squares of the correlations thus formed during one modulation period being compared to a threshold, exceeding of this threshold indicating at the same time the acquisition of the frame synchronization, the frequency correction to be effected on the local carrier and the optimum position of the sampling instants to be used for the transmission of the data following this acquisition of frame synchronization.

11. A receiver as claimed in any one of the claims 7 to 10 wherein in order to make the final frequency correction of the local carrier operative, there are provided a memory into which this final frequency correction is stored, means to accumulate the said final frequency correction at a rate equal to the sampling frequency $1/T$, and thus to produce a phase correction term $\Psi_{VCO}$, and calculating means to form from the samples of the received signal $S_r$, $S_i$ the corrected samples $e_r$, $e_i$ such that:

$e_r = S_r \cos \Psi_{VCO} + S_i \sin \Psi_{VCO}$ $e_i = S_i \cos \Psi_{VCO} - S_r \sin \Psi_{VCO}$.

* * * * *

UNITED STATES PATENT AND TRADEMARK OFFICE
CERTIFICATE OF CORRECTION

PATENT NO. : 4,527,278
DATED : July 2, 1985
INVENTOR(S) : Alain Deconche et al

It is certified that error appears in the above-identified patent and that said Letters Patent is hereby corrected as shown below:

Claim 8, Col. 25, lines 49-54, following the right bracket ( ] ) insert --

$$E^* = \sin \Delta\varphi \left[ \frac{\sin \frac{\Delta\varphi}{2}}{b \sin \frac{\Delta\varphi}{2b}} \right]^2 , \quad E^x = \sin$$

Signed and Sealed this

Ninth Day of February, 1988

Attest:

DONALD J. QUIGG

*Attesting Officer*       *Commissioner of Patents and Trademarks*